(12) United States Patent
Richey

(10) Patent No.: US 11,211,607 B2
(45) Date of Patent: Dec. 28, 2021

(54) BIPOLAR ELECTRODE COMPRISING A LOADED CARBON FELT

(71) Applicant: EOS Energy Storage, LLC, Edison, NJ (US)

(72) Inventor: Francis W. Richey, Brooklyn, NY (US)

(73) Assignee: Eos Energy Storage LLC, Edison, NJ (US)

( * ) Notice: Subject to any disclaimer, the term of this patent is extended or adjusted under 35 U.S.C. 154(b) by 47 days.

(21) Appl. No.: 16/768,488

(22) PCT Filed: Nov. 27, 2018

(86) PCT No.: PCT/US2018/062558
§ 371 (c)(1),
(2) Date: May 29, 2020

(87) PCT Pub. No.: WO2019/108513
PCT Pub. Date: Jun. 6, 2019

(65) Prior Publication Data
US 2020/0388844 A1 Dec. 10, 2020

Related U.S. Application Data

(60) Provisional application No. 62/593,332, filed on Dec. 1, 2017.

(51) Int. Cl.
*H01M 4/583* (2010.01)
*H01M 4/04* (2006.01)
(Continued)

(52) U.S. Cl.
CPC ......... *H01M 4/583* (2013.01); *H01M 4/0416* (2013.01); *H01M 4/364* (2013.01);
(Continued)

(58) Field of Classification Search
CPC .... H01M 4/583; H01M 4/0416; H01M 4/364; H01M 4/602; H01M 4/661;
(Continued)

(56) References Cited

U.S. PATENT DOCUMENTS 3,352,720 A    11/1967  Wilson et al.
4,029,854 A     6/1977  Walsh et al.
(Continued)

FOREIGN PATENT DOCUMENTS

EP    2590250 A1    5/2013
EP    3379626 A1    9/2018
(Continued)

OTHER PUBLICATIONS

Mastragostino, M. et al., "Polymeric Salt as Bromine Complexing Agent in a Zn-Br2 Model Battery", Electrochimica Acta, vol. 28, No. 4, pp. 501-505 (1983).
(Continued)

*Primary Examiner* — Stewart A Fraser
(74) *Attorney, Agent, or Firm* — Botos Churchill IP Law LLP

(57) ABSTRACT

Bipolar electrodes comprising a carbon felt loaded with a polymer material and a nanocarbon material are described herein. The bipolar electrodes are useful in electrochemical cells. In particular, the loaded carbon felt can be used in bipolar electrodes of zinc-halide electrolyte batteries. Processes for manufacturing the loaded carbon felt are also described, involving contacting (e.g., dipping) a carbon felt in a mixture of solvent, polymer material and nanocarbon material.

51 Claims, 25 Drawing Sheets

(51) Int. Cl.
- *H01M 4/36* (2006.01)
- *H01M 10/36* (2010.01)
- *H01M 12/08* (2006.01)
- *H01M 4/60* (2006.01)
- *H01M 4/66* (2006.01)
- *H01M 4/02* (2006.01)

(52) U.S. Cl.
CPC .......... *H01M 4/602* (2013.01); *H01M 4/661* (2013.01); *H01M 10/365* (2013.01); *H01M 12/085* (2013.01); *H01M 2004/029* (2013.01); *H01M 2300/0002* (2013.01)

(58) Field of Classification Search
CPC ............. H01M 10/365; H01M 12/085; H01M 2004/029; H01M 2300/0002
See application file for complete search history.

(56) References Cited

U.S. PATENT DOCUMENTS

| | | | | |
|---|---|---|---|---|
| 4,037,032 A * | 7/1977 | Nidola | .................. | H01M 4/664 |
| | | | | 429/199 |
| 4,167,607 A * | 9/1979 | de Nora | .................. | H01M 4/00 |
| | | | | 429/51 |
| 2013/0189592 A1 * | 7/2013 | Roumi | .................... | H01M 8/20 |
| | | | | 429/406 |
| 2018/0019475 A1 * | 1/2018 | Adamson | .............. | H01M 10/38 |

FOREIGN PATENT DOCUMENTS

| | | |
|---|---|---|
| JP | 2007026774 A | 2/2007 |
| WO | 2016057457 A2 | 4/2016 |
| WO | 2017135709 A1 | 8/2017 |

OTHER PUBLICATIONS

International Search Report issued in corresponding PCT Application No. PCT/US2018/062558 dated Mar. 1, 2019.

Lin, et al., "Effect of carbon black structure on the effectiveness of carbon black thermal interface pastes", Carbon, Elsevier, Oxford, GB, vol. 45, No. 15, Oct. 17, 2007 (Oct. 17, 2007), XP022370137, pp. 2922-2931.

North America, et al., "Specialty Carbon Blacks PBX 52 Carbon Additive", Sep. 1, 2017 (Sep. 1, 2017), XP055558267, Retrieved from the Internet: URL:http://www.cabotcorp.mx/-/media/files/product-datasheets/datasheet-pbx-52pdf.pdf [retrieved on Feb. 18, 2019].

Written Opinion issued in corresponding PCT Application No. PCT/US2018/062558 dated Mar. 1, 2019.

* cited by examiner

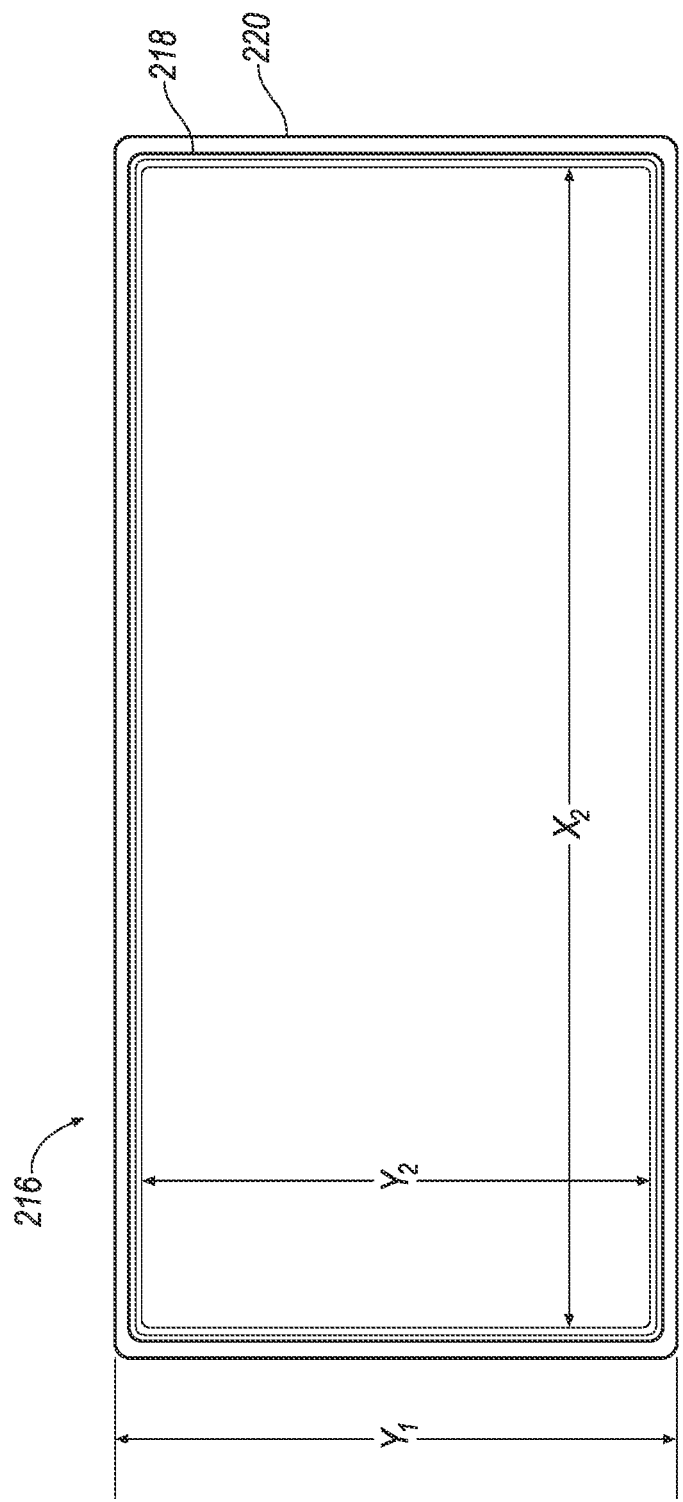
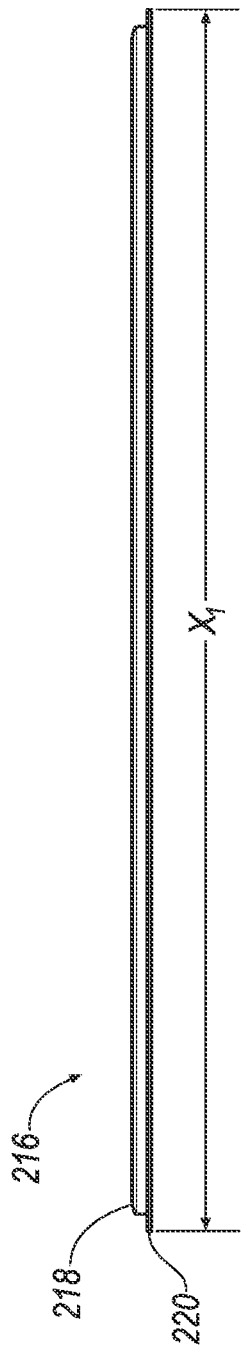
FIG. 6A
FIG. 6B

BIPOLAR ELECTRODE COMPRISING A LOADED CARBON FELT

CROSS REFERENCE TO RELATED APPLICATIONS

The present application is a national phase entry under 35 U.S.C. § 371 of International Application No. PCT/US2018/062558, filed Nov. 27, 2018, published in English, which claims the benefit of U.S. Provisional Application No. 62/593,332, filed Dec. 1, 2017. The contents of all of the above-identified applications are incorporated herein by reference in their entirety.

TECHNICAL FIELD

This invention relates to bipolar electrodes comprising a carbon felt (e.g., carbon felt cloth) loaded with a polymer material and a nanocarbon material, which are useful in electrochemical cells. In particular, the loaded carbon felt can be used in bipolar electrodes of zinc-halide electrolyte batteries.

BACKGROUND

Zinc-halide batteries were developed as devices for storing electrical energy. Traditional zinc-halide batteries (e.g., zinc-bromine batteries) employed bipolar electrodes disposed in a static, i.e., non-flowing, zinc-bromide aqueous solution. The process of charging and discharging electrical current in a zinc-halide battery is generally achieved through a reaction of redox couples like $Zn^{2+}/Zn(s)$ and $X^-/X_2$ in zinc halide electrolyte. When the battery is charged with electrical current, the following chemical reactions occur:

$$Zn^{2+} + 2e^- \rightarrow Zn$$

$$2X^- \rightarrow X_2 + 2e^-,$$

wherein X is a halogen (e.g., Cl, Br, or I). Conversely, when the battery discharges electrical current, the following chemical reactions occur:

$$Zn \rightarrow Zn^{2+} + 2e^-$$

$$X_2 + 2e^- \rightarrow 2X^-.$$

These zinc-halide storage batteries were formed in a bipolar electrochemical cell stack, wherein each electrode comprises two poles, such that the anodic reaction occurs on one side of the electrode, and the cathodic reaction occurs on the opposite side of the same electrode. In this vein, bipolar electrodes were often configured as plates, and the cell stack was assembled to form a prismatic geometry. During charging and discharging of the bipolar battery, the electrode plates function as conductors for adjacent cells, i.e., each electrode plate serves as the anode for one cell and the cathode for the adjacent cell. In this prismatic battery geometry, the entire surface area of the electrode plate that separates adjacent electrochemical cells transfers current from cell to cell.

Accordingly, when a traditional bipolar zinc-halide battery charges, zinc metal electrolytically plates on the anode side of the bipolar electrode plate while molecular halogen species form at the cathode side of the electrode plate. And, when the battery discharges, the plated zinc metal is oxidized to free electrons that are conducted through the electrode plate and reduce the molecular halogen species to generate halide anions.

However, battery performance of traditional rechargeable zinc-halide batteries is severely limited due to reduced energy efficiency, reduced sequestration of halide ions, uneven plating of zinc metal, chemical degradation of the electrolyte, and/or other technical problems associated with these battery systems. For example, uneven or irregular zinc plating on the bipolar electrode generates zinc dendrites in the battery and reduces battery capacity and cycle life. Moreover, uneven zinc plating creates heterogeneity in battery discharge currents that negatively affects battery performance as a storage device for electrical energy.

Accordingly, there is a need for innovative batteries and components thereof that that improve energy and/or coulombic efficiency in electrochemical cells and batteries.

SUMMARY OF THE INVENTION

The present invention provides a bipolar electrode comprising a loaded carbon felt (e.g., a loaded carbon felt cloth).

In one aspect, the present invention provides a bipolar electrode comprising: a plate of titanium having a cathode surface and an anode surface; and a carbon felt loaded with a polymer material and a nanocarbon material, wherein the cathode surface opposes the anode surface, and the cathode surface at least partially contacts the carbon felt.

In some embodiments, the felt is attached to the cathode surface (e.g., attached with an adhesive).

In some embodiments, the polymer material is selected from poly(diallyldimethylammonium chloride), polyvinylidene fluoride, nafion, polytetrafluoroethylene, poly(acrylic acid), polypyrrole, polyacrylamide, poly(N,N-dimethyl)-3,4-pyrrolidinium bromide, or any combination thereof. For example, the polymer material is poly(diallyldimethylammonium chloride).

In some embodiments, the nanocarbon material comprises a powder, wherein the powder comprises graphite, carbon, or any combination thereof; and the powder has a mean particle diameter of less than about 100 microns. For example, the nanocarbon material comprises titanium carbide powder, graphene powder, carbon nanotubes, nanographite powder, or any combination thereof. For example, the nanocarbon material has a mean surface area of from about 50 to about 1000 m²/gram (e.g., from about 200 to about 300 m²/gram) of nanocarbon material.

In some embodiments, the carbon felt is carbonized, graphitized, activated, or any combination thereof. In some embodiments, the carbon felt has a thickness of from about 2 mm to about 10 mm (e.g., from about 3 mm to about 8 mm).

In some embodiments, the carbon felt is loaded with a total concentration of polymer material and nanocarbon material of from about 0.001 to about 0.5 (e.g., from about 0.01 to about 0.3) grams per gram of the carbon felt.

In some embodiments, the polymer material is poly(diallyldimethylammonium chloride) and the nanocarbon material comprises graphite powder having a mean surface area of from about 50 to about 1000 m²/gram of nanocarbon material.

Another aspect of the present invention provides a process for manufacturing a bipolar electrode, the process comprising: mixing a polymer material, a nanocarbon material, and a solvent to form a mixture; contacting a carbon felt with the mixture, wherein the carbon felt is loaded with the mixture to create a loaded carbon felt; and contacting at least a portion of the loaded carbon felt with a cathodic side of a titanium plate to form the bipolar electrode.

In some embodiments, the process further comprises drying the loaded carbon felt. In some embodiments, the process further comprises sonicating the mixture before and/or during contacting the carbon felt with the mixture. In some embodiments, the process further comprises dipping the carbon felt in the mixture.

In some embodiments, the concentration of the polymer material in the mixture is from about 0.01 wt % to about 10 wt %, the concentration of the nanocarbon material in the mixture is from about 0.01 wt % to about 25 wt %, and the concentration of solvent in the mixture is from about 65 wt % to about 99.98 wt %.

In some embodiments, the process further comprises treating the carbon felt, wherein the treating is selected from carbonizing, activating, graphitizing, or any combination thereof. In some embodiments, the carbonizing, activating, or graphitizing or combination thereof occurs prior to contacting the carbon felt with the mixture.

Another aspect of the present invention provides an electrochemical cell comprising: a bipolar electrode comprising a plate of titanium having a cathode surface and an anode surface and a carbon felt loaded with a polymer material and a nanocarbon material, wherein the cathode surface opposes the anode surface, and the cathode surface at least partially contacts the carbon felt; and an aqueous zinc-halide electrolyte.

In some embodiments, the polymer material is selected from poly(diallyldimethylammonium chloride), polyvinylidene fluoride, nafion, polytetrafluoroethylene, poly (acrylic acid), polypyrrole, polyacrylamide, \ poly(N,N-dimethyl)-3,4-pyrrolidinium bromide, or any combination thereof. For example, the polymer material is poly(diallyldimethylammonium chloride).

In some embodiments, the nanocarbon material comprises a powder, wherein the powder comprises graphite, carbon, or any combination thereof; and the powder has a mean particle diameter of less than about 100 microns. For example, the nanocarbon material comprises titanium carbide powder, graphene powder, carbon nanotubes, nanographite powder, or any combination thereof. For example, the nanocarbon material has a mean surface area of from about 50 to about 1000 $m^2$/gram (e.g., from about 200 to about 300 $m^2$/gram) of nanocarbon material.

In some embodiments, the carbon felt is carbonized, graphitized, activated, or any combination thereof. In some embodiments, the carbon felt has a thickness of from about 2 mm to about 10 mm.

In some embodiments, the carbon felt is loaded with a total concentration of polymer material and nanocarbon material of from about 0.001 to about 0.5 (e.g., from about 0.01 to about 0.3) grams per gram of the carbon felt.

In some embodiments, the polymer material is poly (diallyldimethylammonium chloride) and the nanocarbon material comprises graphite powder having a mean surface area of from about 50 to about 1000 $m^2$/gram of nanocarbon material.

In some embodiments, the aqueous zinc-halide electrolyte comprises from about 25 wt % to about 70 wt % of $ZnBr_2$; from about 5 wt % to about 50 wt % of water; and from about 0.05 wt % to about 10 wt % of one or more quaternary ammonium agents.

In some embodiments, the aqueous zinc-halide electrolyte comprises from about 25 wt % to about 40 wt % of $ZnBr_2$; from about 25 wt % to about 50 wt % of water; from about 5 wt % to about 15 wt % of KBr; from about 5 wt % to about 15 wt % of KCl; and from about 0.5 wt % to about 10 wt % of the one or more quaternary ammonium agents.

In some embodiments, the one or more quaternary ammonium agents comprises a quaternary agent selected from the group consisting of ammonium chloride, tetraethylammonium bromide, tetraethylammonium chloride, trimethylpropylammonium bromide, triethylmethyl ammonium chloride, trimethylpropylammonium chloride, butyltrimethylammonium chloride, trimethylethyl ammonium chloride, N-methyl-N-ethylmorpholinium bromide, N-methyl-N-ethylmorpholinium bromide (MEMBr), 1-ethyl-1-methylmorpholinium bromide, N-methyl-N-butylmorpholinium bromide, N-methyl-N-ethylpyrrolidinium bromide, N,N,N-triethyl-N-propyl ammonium bromide, N-ethyl-N-propylpyrrolidinium bromide, N-propyl-N-butylpyrrolidinium bromide, N-methyl-N-butylpyrrolidinium bromide, 1-methyl-1-butylpyrrolidinium bromide, N-ethyl-N-(2-chloroethyl)pyrrolidinium bromide, N-methyl-N-hexylpyrrolidinium bromide, N-methyl-N-pentylpyrrolidinium bromide, N-ethyl-N-pentylpyrrolidinium bromide, N-ethyl-N-butylpyrrolidinium bromide, trimethylene-bis(N-methylpyrrolidinium) dibromide, N-butyl-N-pentylpyrrolidinium bromide, N-methyl-N-propylpyrrolidinium bromide, N-propyl-N-pentylpyrrolidinium bromide, 1-ethyl-4-methylpyridinium bromide, 1-ethyl-2-methylpyridinium bromide, 1-butyl-3-methylpyridinium bromide, cetyltrimethylammonium bromide, cetyltrimethylammonium chloride, cetyltriethylammonium bromide, and any combination thereof.

In some embodiments, the one or more quaternary ammonium agents comprises an alkyl substituted pyridinium chloride, an alkyl substituted pyridinium bromide, an alkyl substituted morpholinium chloride, an alkyl substituted morpholinium bromide, an alkyl substituted pyrrolidinium chloride, an alkyl substituted pyrrolidinium bromide, or any combination thereof.

Another aspect of the present invention provides a battery stack comprising: a pair of terminal assemblies; at least one bipolar electrode interposed between the pair of terminal assemblies, wherein the bipolar electrode comprises: a bipolar electrode plate comprising titanium; a carbon felt, wherein the carbon felt is loaded with a polymer material and a nanocarbon material; and an aqueous zinc-halide electrolyte in contact with the bipolar electrode plate and the carbon felt.

In some embodiments, the polymer material is selected from poly(diallyldimethylammonium chloride), polyvinylidene fluoride, nafion, polytetrafluoroethylene, poly (acrylic acid), polypyrrole, polyacrylamide, poly(N,N-dimethyl)-3,4-pyrrolidinium bromide, or any combination thereof. For example, the polymer material is poly(diallyldimethylammonium chloride).

In some embodiments, the nanocarbon material comprises a powder, wherein the powder comprises graphite, carbon, or any combination thereof; and the powder has a mean particle diameter of less than about 100 microns. For example, the nanocarbon material comprises titanium carbide powder, graphene powder, carbon nanotubes, nanographite powder, or any combination thereof. For example, the nanocarbon material has a mean surface area of from about 50 to about 1000 $m^2$/gram (e.g., from about 200 to about 300 $m^2$/gram) of nanocarbon material.

In some embodiments, the carbon felt is carbonized, graphitized, activated, or any combination thereof. In some embodiments, the carbon felt has a thickness of from about 2 mm to about 10 mm.

In some embodiments, the carbon felt is loaded with a total concentration of polymer material and nanocarbon material of from about 0.001 to about 0.5 (e.g., from about 0.01 to about 0.3) grams per gram of the carbon felt.

In some embodiments, the polymer material is poly (diallyldimethylammonium chloride) and the nanocarbon material comprises graphite powder having a mean surface area of from about 50 to about 1000 m$^2$/gram of nanocarbon material.

In some embodiments, the aqueous zinc-halide electrolyte comprises from about 25 wt % to about 70 wt % of $ZnBr_2$; from about 5 wt % to about 50 wt % of water; and from about 0.05 wt % to about 10 wt % of one or more quaternary ammonium agents.

In some embodiments, the aqueous zinc-halide electrolyte comprises from about 25 wt % to about 40 wt % of $ZnBr_2$; from about 25 wt % to about 50 wt % water; from about 5 wt % to about 15 wt % of KBr; from about 5 wt % to about 15 wt % of KCl; and from about 0.5 wt % to about 10 wt % of the one or more quaternary ammonium agents.

In some embodiments, the one or more quaternary ammonium agents comprises a quaternary agent selected from the group consisting of ammonium chloride, tetraethylammonium bromide, tetraethylammonium chloride, trimethylpropylammonium bromide, triethylmethyl ammonium chloride, trimethylpropylammonium chloride, butyltrimethylammonium chloride, trimethylethyl ammonium chloride, N-methyl-N-ethylmorpholinium bromide, N-methyl-N-ethylmorpholinium bromide (MEMBr), 1-ethyl-1-methylmorpholinium bromide, N-methyl-N-butylmorpholinium bromide, N-methyl-N-ethylpyrrolidinium bromide, N,N,N-triethyl-N-propyl ammonium bromide, N-ethyl-N-propylpyrrolidinium bromide, N-propyl-N-butylpyrrolidinium bromide, N-methyl-N-butylpyrrolidinium bromide, 1-methyl-1-butylpyrrolidinium bromide, N-ethyl-N-(2-chloroethyl)pyrrolidinium bromide, N-methyl-N-hexylpyrrolidinium bromide, N-methyl-N-pentylpyrrolidinium bromide, N-ethyl-N-pentylpyrrolidinium bromide, N-ethyl-N-butylpyrrolidinium bromide, trimethylene-bis(N-methylpyrrolidinium) dibromide, N-butyl-N-pentylpyrrolidinium bromide, N-methyl-N-propylpyrrolidinium bromide, N-propyl-N-pentylpyrrolidinium bromide, 1-ethyl-4-methylpyridinium bromide, 1-ethyl-2-methylpyridinium bromide, 1-butyl-3-methylpyridinium bromide, cetyltrimethylammonium bromide, cetyltrimethylammonium chloride, cetyltriethylammonium bromide, and any combination thereof.

In some embodiments, the one or more quaternary ammonium agents comprises an alkyl substituted pyridinium chloride, an alkyl substituted pyridinium bromide, an alkyl substituted morpholinium chloride, an alkyl substituted morpholinium bromide, an alkyl substituted pyrrolidinium chloride, an alkyl substituted pyrrolidinium bromide, or any combination thereof.

BRIEF DESCRIPTION OF THE DRAWINGS

These and other features, aspects, and advantages of the present invention will become better understood when the following detailed description is read with reference to the accompanying drawings.

FIGS. 6A and 6B show a front and side view, respectively, of a cathode cage according to an embodiment of the present invention.

Figure 1:
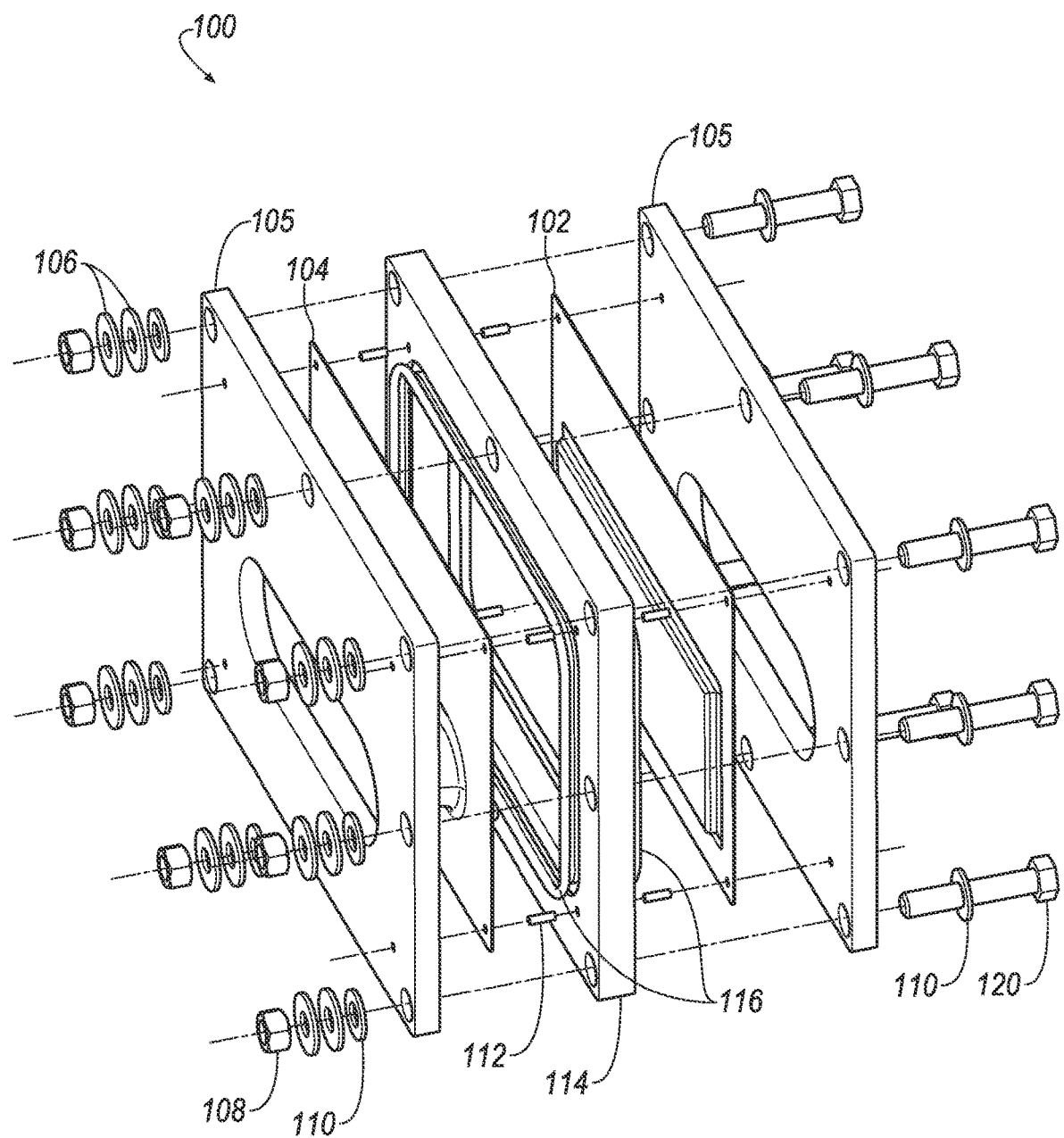
FIG. 1 shows an exploded view of an electrochemical cell according to an embodiment of the present invention.
Figure 2:
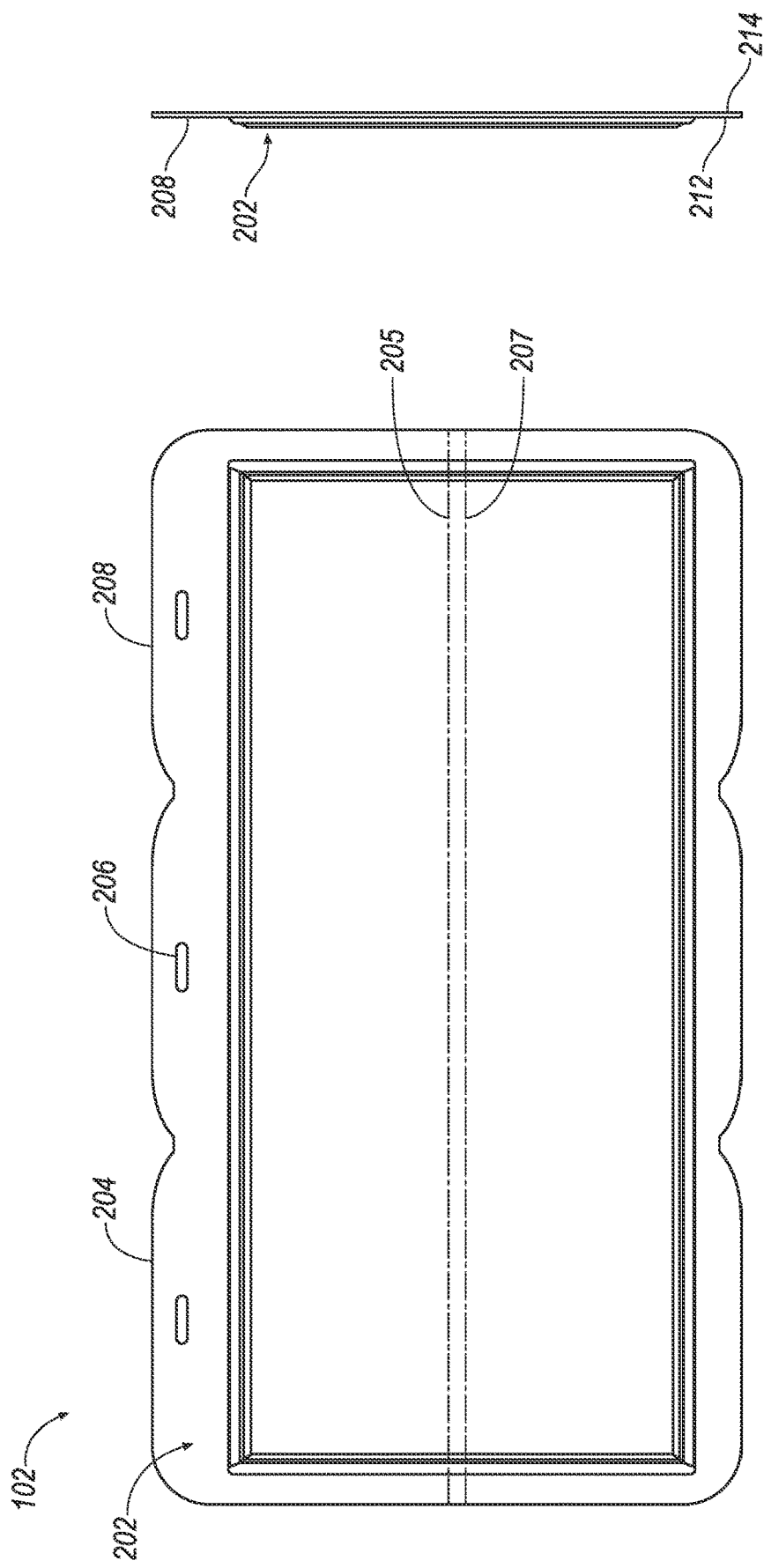
FIGS. 2A and 2B are front and side views, respectively, of a bipolar electrode according to an embodiment of the present invention.
Figure 3:
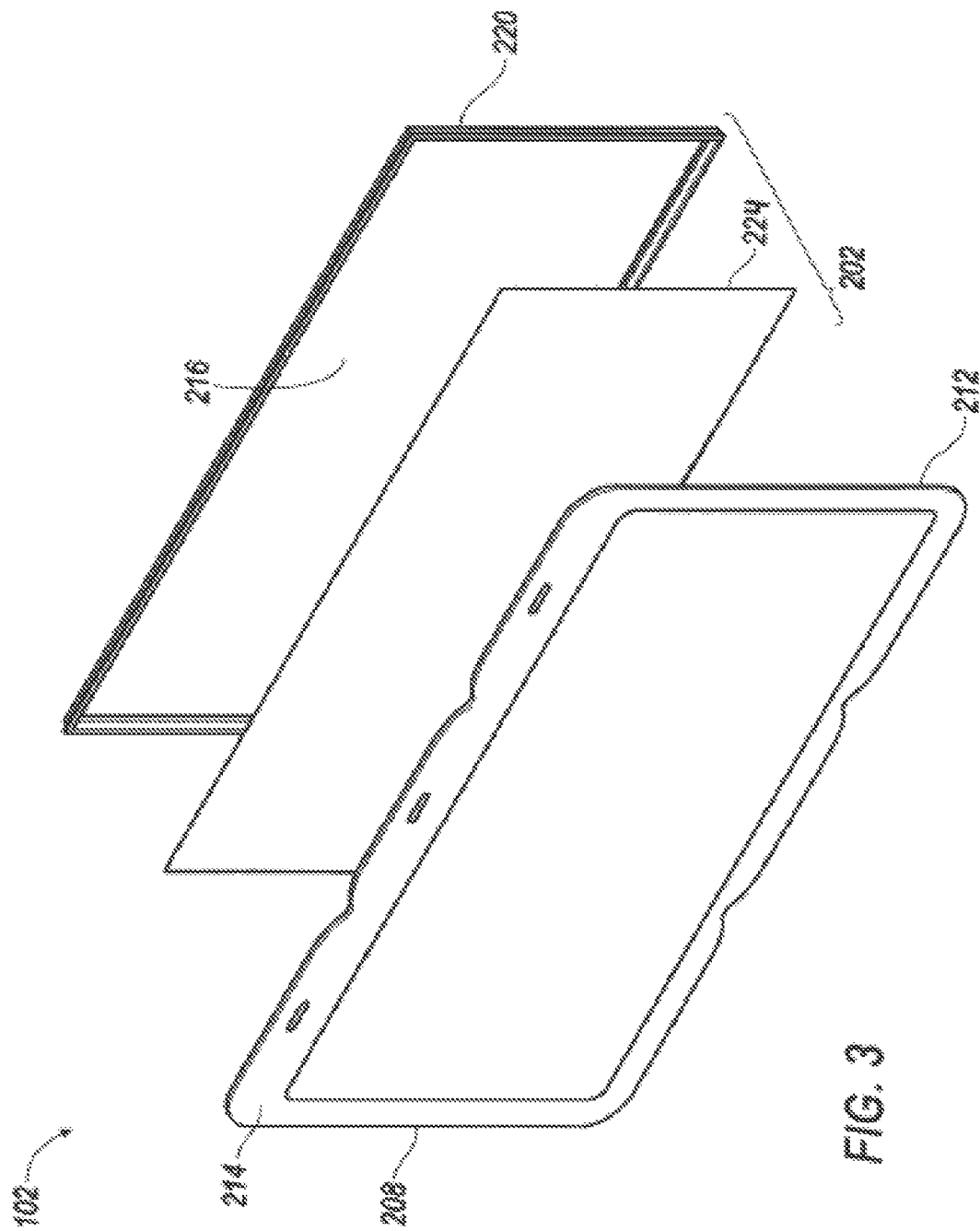
FIG. 3 shows an exploded view of a bipolar electrode according to an embodiment of the present invention.
Figure 4B:
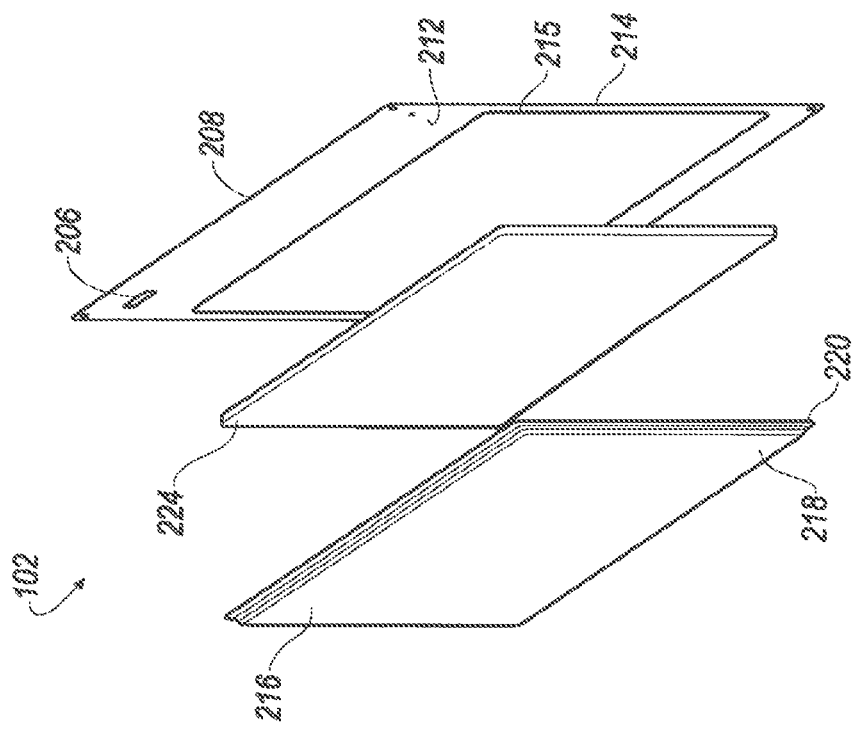
FIG. 4B shows an exploded view of a bipolar electrode according to an embodiment of the present invention.
Figure 4A:
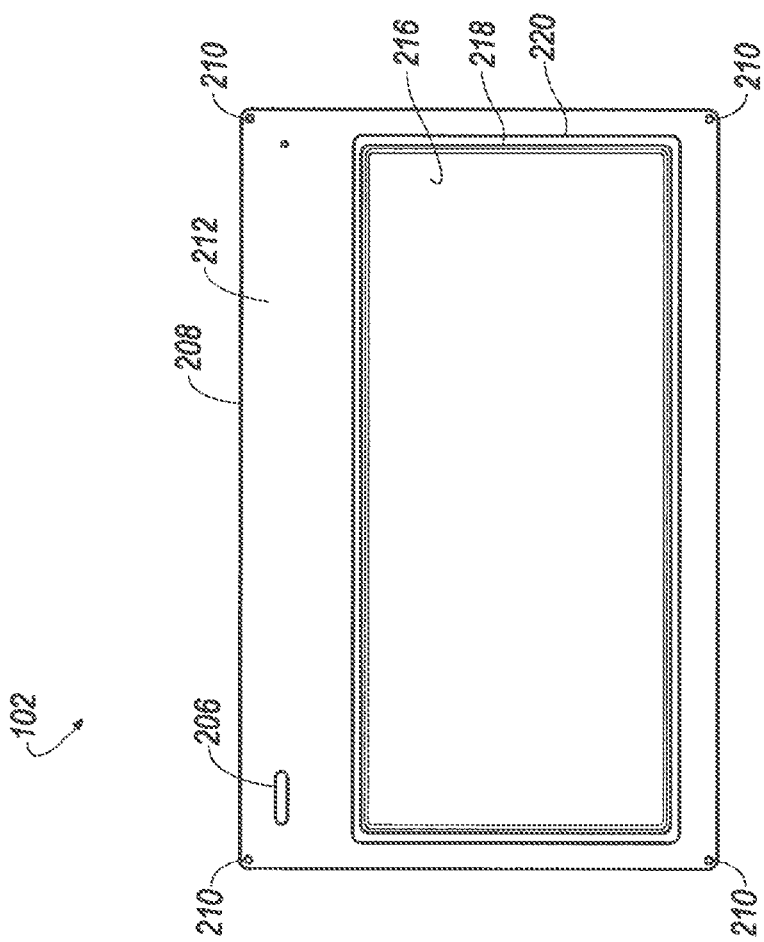
FIG. 4A shows a front view of a bipolar electrode according to an embodiment of the present invention.
Figure 5:
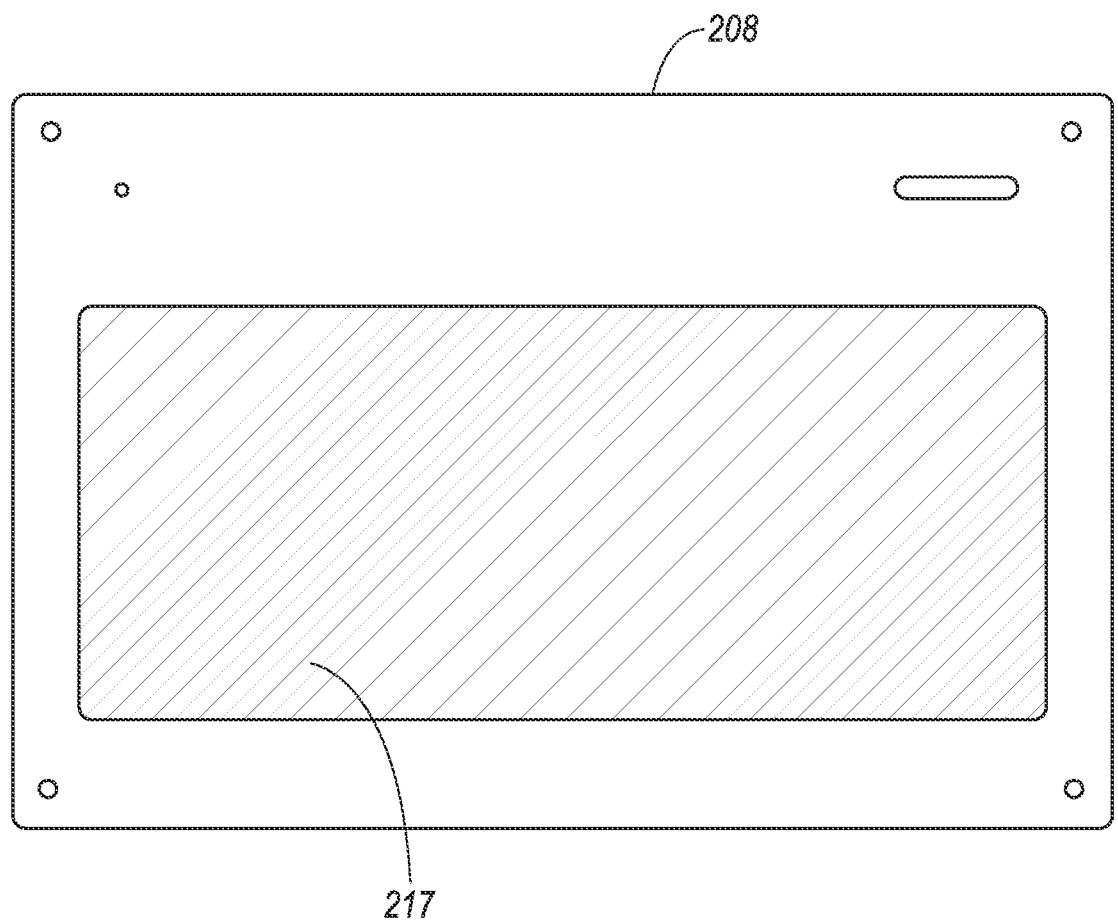
FIG. 5 shows a view of the back surface of an electrode plate having a sandblasted area according to an embodiment of the present invention.

The figures are provided by way of example and are not intended to limit the scope of the invention.

DETAILED DESCRIPTION

The present invention provides bipolar electrodes comprising a loaded carbon felt. The bipolar electrodes are useful in secondary, i.e., rechargeable zinc halide storage batteries (e.g., bipolar flow or non-flow batteries).

I. DEFINITIONS

As used herein, the term "electrochemical cell" or "cell" are used interchangeably to refer to a device capable of either generating electrical energy from chemical reactions or facilitating chemical reactions through the introduction of electrical energy.

As used herein, the term "battery" encompasses electrical storage devices comprising at least one electrochemical cell. A "secondary battery" is rechargeable, whereas a "primary battery" is not rechargeable. For secondary batteries of the present invention, a battery anode is designated as the positive electrode during discharge, and as the negative electrode during charge.

As used herein, an "electrolyte" refers to a substance that behaves as an ionically conductive medium. For example, the electrolyte facilitates the mobilization of electrons and cations in the cell. Electrolytes include mixtures of materials such as aqueous solutions of metal halide salts (e.g., $ZnBr_2$, $ZnCl_2$, or the like).

As used herein, the term "electrode" refers to an electrical conductor used to make contact with a nonmetallic part of a circuit (e.g., a semiconductor, an electrolyte, or a vacuum). An electrode may also refer to either an anode or a cathode.

As used herein, the term "loaded" refers to a material (e.g., carbon felt cloth) that is impregnated and/or coated with a loading material (e.g., a polymer material and/or a nanocarbon material) on its inner and/or outer surfaces. The term "loaded" refers to the carbon felt both when contacted (e.g., soaked) with a solvent mixture containing loading materials (e.g., polymer material and/or nanocarbon material) and when dried or substantially dried, leaving the loading materials coated on or impregnated in the carbon felt.

As used herein, the term "felt" refers to a non-woven textile formed from natural (e.g., plant (e.g., bamboo) or animal (e.g., wool)) fibers or synthetic (e.g., polyester, polypropylene, fluoropolymers (e.g., PTFE), polyacrylonitrile, any combination thereof, or the like) fibers, wherein the fibers are compressed and matted together until they connect to form a fabric (e.g., cloth).

As used herein, the term "nanocarbon material" refers to a material having carbon as a primary component and composed of particles having at least one dimension with an average length of less than 1 micron. Many non-limiting examples of nanocarbon materials are described herein, including titanium carbide powder, graphene powder, carbon nanotubes, and nanographite powder.

As used herein in, the term "anode" refers to the negative electrode from which electrons flow during the discharging phase in the battery. The anode is also the electrode that undergoes chemical oxidation during the discharging phase. However, in secondary, or rechargeable, cells, the anode is the electrode that undergoes chemical reduction during the cell's charging phase. Anodes are formed from electrically conductive or semiconductive materials, e.g., metals (e.g., titanium or TiC coated titanium), metal oxides, metal alloys, metal composites, semiconductors, or the like.

As used herein, the term "cathode" refers to the positive electrode into which electrons flow during the discharging phase in the battery. The cathode is also the electrode that undergoes chemical reduction during the discharging phase. However, in secondary or rechargeable cells, the cathode is the electrode that undergoes chemical oxidation during the cell's charging phase. Cathodes are formed from electrically conductive or semiconductive materials, e.g., metals, metal oxides, metal alloys, metal composites, semiconductors, or the like.

As used herein, the term "bipolar electrode" refers to an electrode that functions as the anode of one cell and the cathode of another cell. For example, in a battery stack, a bipolar electrode functions as an anode in one cell and functions as a cathode in an immediately adjacent cell. In some examples, a bipolar electrode comprises two surfaces, a cathode surface and an anode surface, wherein the two surfaces are connected by a conductive material. For instance, a bipolar electrode plate may have opposing surfaces wherein one surface is the anode surface, the other surface is the cathode surface, and the conductive material is the thickness of the plate between the opposing surfaces.

As used herein, the term "halide" refers to a binary compound of a halogen with another element or radical that is less electronegative (or more electropositive) than the halogen, to make a fluoride, chloride, bromide, iodide, or astatide compound.

As used herein, the term "halogen" refers to any of the elements fluorine, chlorine, bromine, iodine, and astatine, occupying group VIIA (17) of the periodic table. Halogens are reactive nonmetallic elements that form strongly acidic compounds with hydrogen, from which simple salts can be made.

As used herein, the term "anion" refers to any chemical entity having one or more permanent negative charges. Examples of anions include, but are not limited to fluoride, chloride, bromide, iodide, arsenate, phosphate, arsenite, hydrogen phosphate, dihydrogen phosphate, sulfate, nitrate, hydrogen sulfate, nitrite, thiosulfate, sulfite, perchlorate, iodate, chlorate, bromate, chlorite, hypochlorite, hypobromite, carbonate, chromate, hydrogen carbonate (bicarbonate), dichromate, acetate, formate, cyanide, amide, cyanate, peroxide, thiocyanate, oxalate, hydroxide, and permanganate.

As used herein, a "titanium material" may include, but is not limited to, titanium (in any oxidation state), TiC, alloys of TiC such as $TiC_xM$ (where x is 0, 1, 2, 3, or 4 and M is a metal), titanium carbohyrides, titanium oxycarbides, titanium oxynitrides, titanium oxycarbonitrides, titanium suboxides, non-stoichiometric titanium-carbon compounds, and any combination thereof.

As used herein, "titanium carbide" is used interchangeably with "titanium carbide material" and includes, but is not limited to TiC, alloys of TiC such as $TiC_xM$ (where x is 0, 1, 2, 3, or 4 and M is a metal), titanium carbohyrides, non-stoichiometric titanium-carbon compounds, and combinations thereof.

As used herein, the term "zinc metal" refers to elemental zinc, also commonly known as Zn(0) or $Zn^0$.

As used herein, the term "weight percent" and its abbreviation "wt %" are used interchangeably to refer to the product of 100 times the quotient of mass of one or more components divided by total mass of a mixture or product containing said component:

wt %=100%×(mass of component(s)/total mass)

When referring to the concentration of components or ingredients for electrolytes, as described herein, wt % is based on the total weight of the electrolyte.

As used herein, the term "quaternary ammonium agent" refers to any compound, salt, or material comprising a quaternary nitrogen atom. For example, quaternary ammonium agents include ammonium halides (e.g., $NH_4Br$, $NH_4Cl$, or any combination thereof), tetra-alkylammonium halides (e.g., tetramethylammonium bromide, tetramethylammonium chloride, tetraethylammonium bromide, tetraethylammonium chloride, alkyl-substituted pyridinium halides, alkyl-substituted morpholinium halides, combinations thereof or the like), heterocyclic ammonium halides (e.g., alkyl-substituted pyrrolidinium halide (e.g., N-methyl-N-ethylpyrrolidinium halide or N-ethyl-N-methylpyrrolidinium halide), alkyl-substituted pyridinium halides, alkyl-substituted morpholinium halides, viologens having at least one quaternary nitrogen atom, combinations thereof, or the like), or any combination thereof. Tetra-alkylammonium halides may be symmetrically substituted or asymmetrically substituted with respect to the substituents of the quaternary nitrogen atom.

II. BIPOLAR ELECTRODES COMPRISING LOADED CARBON FELT

Figure 26:
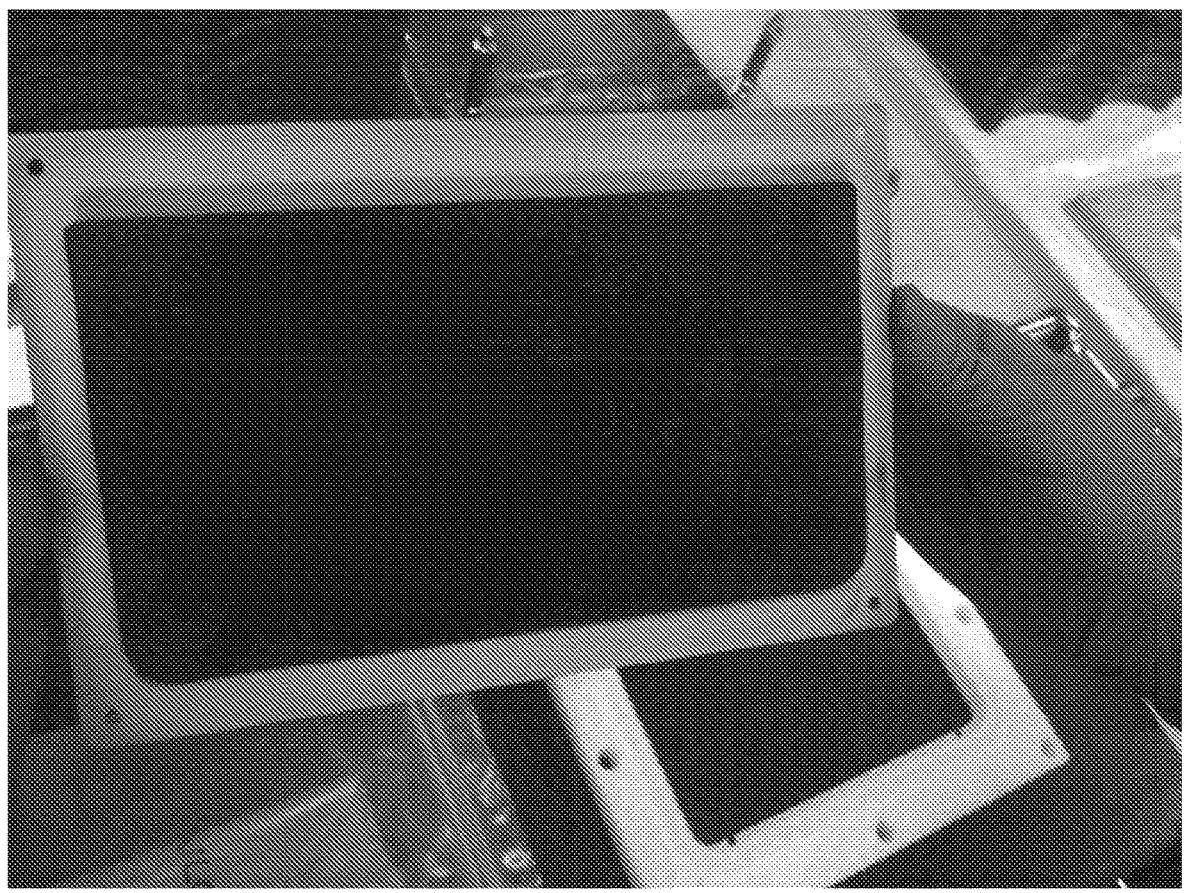
FIG. 26 shows a bipolar electrode comprising a loaded carbon felt according to another aspect of the present invention.

Referring to FIG. 26, one aspect of the present invention provides a bipolar electrode that comprises a titanium plate having a cathode surface and an anode surface; and a carbon felt loaded with a polymer material and a nanocarbon material, wherein the cathode surface opposes the anode surface, and the cathode surface at least partially contacts the carbon felt.

In some instances, the loaded carbon felt is attached to the cathode surface using any suitable means. For example, the loaded carbon felt is adhesively attached to the cathode surface.

In some embodiments, the carbon felt is loaded with a polymer material selected from poly(diallyldimethylammonium chloride), polyvinylidene fluoride, nafion, polytetrafluoroethylene, poly(acrylic acid), polypyrrole, polyacrylamide, poly(N,N-dimethyl)-3,4-pyrrolidinium bromide, or any combination thereof. In some instances, the polymer material is poly(diallyldimethylammonium chloride).

In some embodiments, the carbon felt is loaded with a nanocarbon material that comprises a powder, wherein the powder comprises graphite, carbon, or any combination thereof; and the powder has a mean particle diameter of less than about 100 microns (e.g., less than about 10 microns, less than about 1 micron, less than about 500 nm, less than about 200 nm, or less than about 100 nm). For example, the nanocarbon material comprises titanium carbide powder, graphene powder, carbon nanotubes, nanographite powder, or any combination thereof. In some embodiments, the nanocarbon material has a mean surface area of from about 50 to about 1000 $m^2$/gram of nanocarbon material. For example, the nanocarbon material has a mean surface area of from about 100 to about 500 $m^2$/gram or from about 200 to about 300 $m^2$/gram of nanocarbon material.

Without limitation, other carbon felt suitable for use in the instant invention is commercially available from Avcarb, Cera Materials, or SGL Group (e.g., Avcarb G150, Avcarb G150A, Avcarb G200, Avcarb G200A, Avcarb G250, Avcarb G250A, Avcarb C150, Avcarb C200, Avcarb C250, Cera GFE-1, SGL GFA5, SGL GFA6, SGL KFD2.5, or SGL GFC4.6). In some embodiments, the carbon felt has a thickness of from about 2 mm to about 10 mm. For example, the carbon felt may have a thickness of from about 4 to about 8 mm, from about 6 to about 10 mm, or from about 2 to about 6 mm.

In some embodiments, the carbon felt is undergoes additional processing. For example, the carbon felt is carbonized, graphitized, activated, or any combination thereof. For example, the carbon felt is carbonized, graphitized and activated. Any of the carbonization, graphitization, and/or activation processes can be performed in any order either before or after the loading of the felt. In some examples, the carbon felt carbon felt is carbonized, graphitized, and activated before being loaded with the nanocarbon material and the polymer material.

An "activated", "carbonized", and/or "graphitized" carbon felt undergoes processing to modify the carbon felt. The activating, carbonizing, and/or graphitizing steps can be performed in any order. The activation process may involve treating the carbon felt with oxygen or air environment. Carbonizing and graphitizing processes may involve one or more of a wide variety of coating processes to provide functionality. For example, dip, slot-die coating (including multilayer), spray, comma bar, reverse roll and meyer rod processes. Converting equipment including slitters, calenders, sheeters, and hot presses, and die-cutters may also be used. In some embodiments, the processing is performed at high temperatures, e.g., greater than about 1000° C. or up to about 3000° C.

Carbonizing and/or graphitizing may also involve chemical vapor deposition (CVD) of carbon or graphite. Typical CVD processes deposit amorphous pyrolytic carbon (PC) onto carbon substrates including carbon fabrics, papers, and tow. Substantially uniform layers may be applied in thicknesses ranging from nanometers to micrometers.

The structure of textiles and composites of textiles can be engineered to create carbon felts suitable for use in electrochemical applications. In some embodiments, the carbon felt comprises fibers comprising polyacrylonitrile (PAN). In some embodiments, the carbon felt is a directly activated non-woven fiber with high surface area. The felt may have such features as large adsorption volume, fast adsorption speed, heat-resistance, acid resistance, and alkaline resistance.

In some embodiments, the carbon felt is loaded with a total concentration of polymer material and nanocarbon material of from about 0.001 to about 0.5 grams per gram of the carbon felt. For example, the carbon felt is loaded with a total concentration of polymer material and nanocarbon material of from about 0.01 to about 0.3 grams per gram of the carbon felt. For example, the carbon felt is loaded with a total concentration of polymer material and nanocarbon material of from about 0.05 to about 0.2 grams per gram of the carbon felt, e.g., about 0.1 grams per gram. This refers to the total loading of polymer material and nanocarbon material. Within this total loading, the individual loading of each of the polymer material and the nanocarbon material may be in a weight ratio (polymer material:nanocarbon material) of from about 1:100 to about 100:1 (e.g., from about 1:10 to about 10:1, from about 1:2 to about 2:1, from about 1:100 to about 1:1, or from about 1:10 to about 1:1). For example, the weight ratio of loaded polymer material to loaded nanocarbon material may be about 100:1, 10:1, 5:1, 2:1, 1.5:1, 1:1, 1:1.5, 1:2, 1:5, 1:10, or 1:100.

In some embodiments, the loaded carbon felt is incorporated onto a bipolar electrode. For example, the loaded carbon felt at least partially contacts the cathode surface of a bipolar electrode plate. The bipolar electrode plate may comprise a titanium plate having a cathode surface and an anode surface. Therefore, one aspect of the invention is a bipolar electrode comprising: a plate of titanium having a cathode surface and an anode surface; and a carbon felt loaded with a polymer material and a nanocarbon material, wherein the cathode surface opposes the anode surface, and the cathode surface at least partially contacts the carbon felt.

A. Processes

The loaded carbon felts of the present invention can be manufactured using any suitable process. For example, a mixture comprising a polymer material, a nanocarbon material, and a solvent are applied or loaded onto a carbon felt to generate a loaded carbon felt. In some instances, the mixture is sprayed onto the carbon felt, and in others, the carbon felt is dip coated in the mixture.

In some embodiments, the process further comprises drying the loaded carbon felt. Drying may be done to allow the solvent from the mixture to evaporate. The drying may be done under vacuum or in a vented environment, such as a laboratory hood. Fast-evaporating solvents (e.g., acetone) may be selected in order to speed up drying time. In some embodiments, the process further comprises sonicating the mixture before and/or during contacting the carbon felt with the mixture. In some embodiments, the carbon felt is dipped in the mixture. For example, the carbon felt is dipped and held submerged in the mixture for about 15 seconds. In some embodiments, the mixture is stirred or agitated before and/or during contacting the carbon felt with the mixture.

In some embodiments, the concentration of the polymer material in the mixture is from about 0.01 wt % to about 10 wt %, the concentration of the nanocarbon material in the mixture is from about 0.01 wt % to about 25 wt %, and the concentration of solvent in the mixture is from about 65 wt % to about 99.98 wt %. For example, the concentration of polymer material may be from about 0.01 wt % to about 5 wt %, e.g., from about 0.1 wt % to about 2 wt %, or about 0.5 wt %. For example, the concentration of nanocarbon material may be from about 0.01 wt % to about 10 wt %, e.g., from about 0.1 wt % to about 5 wt %, or about 0.5 wt %. And, for example, the concentration of solvent may be from about 85 wt % to about 99.98 wt %, e.g., from about 93 wt % to about 99.8 wt %, or about 99 wt %.

The polymer materials and nanocarbon materials used in the process, (i.e., provided in the mixture) are the polymer materials and nanocarbon materials discussed above and throughout, i.e., those of the loaded carbon felt. The solvent may be any suitable solvent that allows for dispersion of the polymer material and nanocarbon material, loading of the carbon felt, and evaporation upon drying of the carbon felt. In some embodiments, the solvent comprises a solvent miscible in water. In some embodiments, the solvent comprises isopropyl alcohol, ethanol, methanol, acetone, dimethylformamide, or any combination thereof. In some embodiments, the solvent comprises water. For example, the solvent may be a mixture of water and isopropyl alcohol. Or for example, the solvent may be a mixture of water, ethanol and acetone.

In some embodiments, the process incorporates a modification process for the carbon felt. The modification process may include one or more of a carbonizing, activating, or graphitizing process that modifies the carbon felt. In some embodiments, the modification process is a pre-treatment process wherein the modification by carbonizing, activating, and/or graphitizing occurs prior to contacting the carbon felt with the mixture.

B. Incorporation of Loaded Carbon Felt onto Bipolar Electrode

The loaded carbon felt comprising the materials described above and made by the process described above can be incorporated onto a bipolar electrode, which may correspondingly be incorporated into the electrochemical cells and battery stacks described herein. To incorporate the loaded carbon felt onto the bipolar electrode, the loaded carbon felt is in contact, or at least partial contact, with a bipolar electrode plate (e.g., a titanium plate), forming the bipolar electrode.

Referring to FIG. 26, in some embodiments, an adhesive may be used to attach the loaded carbon felt and the cathode side of the bipolar electrode plate. In some embodiments, at least a portion of the cathode surface is coated with adhesive, and the loaded carbon felt is placed on top of the adhesive, pressure (e.g., 3 psi, 5 psi, or the like) is applied to the top of the loaded carbon felt, and the adhesive or glue is then cured or dried (e.g., for 1 hour).

In other embodiments, the cathode cage holds the loaded carbon felt in contact with the cathode side of the bipolar electrode plate. Suitable cathode cage configurations for holding the loaded carbon felt in contact with the bipolar electrode plate are described below and throughout.

Either an adhesive or a cathode cage, or both, may be used to incorporate the loaded carbon felt onto the bipolar electrode plate. Therefore, it is possible to have a bipolar electrode (and corresponding electrochemical cell) with no cathode cage, where the adhesive/glue is used to maintain contact. Likewise, it is possible to have a bipolar electrode (and corresponding electrochemical cell) with no adhesive/glue, where the cathode cage is used to maintain contact.

One exemplary glue that may be used to hold the carbon felt in contact with the bipolar electrode plate is a glue comprising a mixture of acetone, polyvinylidene fluoride, methyl mathacrylate/n-butyl methacrylate copolymer, and graphite. In some embodiments, the glue comprises from about 50 wt % to about 75 wt % acetone, from about 10 wt % to about 20 wt % polyvinylidene fluoride, from about 5 wt % to about 10 wt % methyl mathacrylate/n-butyl methacrylate copolymer, and from about 10 wt % to about 20 wt % graphite. For example, the glue may comprise acetone, Kynar 2750, Elvacite 4111, and Timrex KS6 graphite.

III. ELECTROCHEMICAL CELLS AND BATTERY STACKS

Referring to FIGS. 1-23, in one aspect the present invention provides a static (non-flowing) bipolar zinc-halide rechargeable electrochemical cell 100 and battery stacks of such cells 1000.

A. Bipolar Electrochemical Cell

The bipolar electrochemical cell of the present invention 100 comprises a bipolar electrode 102, a terminal assembly 104, and a zinc-halide electrolyte.

1. Bipolar Electrodes

Bipolar electrodes 102, 102' of present invention comprise a bipolar electrode plate 208 having a front surface 212 and a back surface 214, wherein a cathode assembly 202 including a loaded felt is affixed to the front surface of the bipolar electrode plate so that the cathode assembly electrically communicates with at least the front surface of the bipolar electrode plate 208. Bipolar electrodes 102 of the present invention are configured to plate zinc metal on an anodic electrode surface (e.g., the back surface of an adjacent bipolar electrode or an inner surface of an endplate of a terminal anode assembly) and generate halide or mixed halide species during charging of the electrochemical cell that are reversibly sequestered in the cathode assembly. Conversely, these electrodes are configured to oxidize plated zinc metal to generate $Zn^{2+}$ cations and reduce the halide or mixed halide species to their corresponding anions during discharging of the electrochemical cell.

a. Bipolar Electrode Plates

Bipolar electrode plates of the present invention 208, 208', comprise a front surface 212 and a back surface 214. The cathode assembly is situated on the front surface 212 (e.g., the cathodic surface) of the bipolar electrode plate 208. In some embodiments, the bipolar electrode plate comprises a conductive material that is relatively inert to the zinc halide electrolyte used in the electrochemical cell or battery stack. In some embodiments, the bipolar electrode plate 208 comprises a titanium material (e.g., titanium or titanium oxide). In some instances, the bipolar electrode plate 208 further comprises a coating or film that covers at least a portion of the front surface 212, at least a portion of the back surface 214, or at least a portion of both surfaces. In other embodiments, the bipolar electrode plate comprises a titanium material that is coated with a titanium carbide material. And, in some embodiments, bipolar plate comprises a titanium material that is thermally diffused with carbon. In these embodiments, at least a portion of the front surface 212, at least a portion of the back surface 214, or at least a portion of both surfaces are coated with the titanium carbide material or thermally diffused with carbon. In some embodiments, the bipolar electrode plate comprises an electrically conductive loaded carbon felt. In some instances, the bipolar electrode plate comprises a graphite plate that is coated with a titanium carbide material. In these embodiments, at least a portion of the front surface 212, the back surface 214, or at least a portion of either of these surfaces is coated with the titanium carbide material.

The bipolar electrode plate of the present invention optionally comprises a recessed portion 215 on the front surface 212 of the bipolar electrode plate. In some embodiments, the bipolar electrode plate comprises a recessed portion 215 on the front surface 212 of the bipolar electrode plate. In some of these embodiments, peripheral edges of the recessed portion 215 are substantially defined by the outermost edge of the flange 220 of the cathode cage 216 of the cathode assembly 202, such that the cathode assembly at least partially fits within recessed portion 215 when the bipolar electrode is assembled. In other embodiments, the peripheral edges of the recessed portion are at least partially within the outermost edge of the flange 220 of the cathode cage 216 of the cathode assembly 202. In some of these embodiments, the recessed portion may be defined by the outermost edge of the loaded carbon felt 224 that is nested within the cathode cage 216 of the cathode assembly 202, such that the loaded carbon felt 224 at least partially fits within recessed portion 215 of the bipolar electrode plate when the bipolar electrode 102 is assembled. And, in some alternative embodiments, the front surface 212 of the bipolar electrode plate lacks a recessed portion such that the surface is at least substantially flat.

Bipolar electrode plates of the present invention may optionally comprise one or more thru holes at or near the periphery 204 of the plate. Referring to FIGS. 2A-4, in some embodiments, the bipolar electrode plate comprises one or more thru holes 206, 210 at or near the periphery 204 of the plate that may be useful for filling an electrochemical cell with liquid electrolyte or may be useful for aligning electrode plates in battery stacks.

The bipolar electrode plates may be formed by stamping or other suitable processes. A portion of the front surface 212, a portion of the back surface 214, or portions of both surfaces may optionally undergo surface treatments (e.g., coating or the like) to enhance the electrochemical properties of the cell or battery stack. The back surface of the bipolar electrode plate may include an electrochemically active region associated with or defined by the formation of a layer of zinc metal upon cell or battery stack charging. In some embodiments, the back surface of the electrode plate may be sandblasted (e.g., sandblasted with SiC or garnet), textured, or otherwise treated within the electrochemically active region. In other embodiments, the front surface may also be sandblasted within an electrochemically active region associated with a region enclosed by the cathode assembly.

For example, in some embodiments, at least a portion of the back surface, at least a portion of the front surface, or at least portions of both surfaces are treated (e.g., sandblasted) to give a rough surface. In some instances, at least a portion of the back surface of the bipolar electrode plate is treated (e.g., sandblasted) to give a rough surface. In some instances, the region of the back surface that is treated to give a rough surface is substantially defined by the periphery of the cathode assembly affixed to the front surface of the electrode plate.

b. Cathode Assemblies

Electrochemical cells and battery stacks of the present invention comprise at least one cathode assembly 202, wherein the cathode assembly is formed from loaded carbon felt 224, and one or both of a cathode cage 216 or an adhesive.

i.a. Cathode Cage

The cathode cage 216 comprises a pocket portion 218 and a flange 220 and is disposed on either the front surface 212, 212' of the bipolar electrode plate or the inner surface 316 of a terminal endplate at the flange 220. Referring to FIGS. 6A and 6B, a front view (FIG. 6A) and a side view (FIG. 6B) of the cathode cage 216 are illustrated. The cathode cage 216 includes an overall area defined by the length $X_1$ and the width $Y_1$ that includes the flange 220. To form the flanges, a flat metal sheet is installed in a forming machine to press the flanges on each of the four edges of the flat sheet. In some implementations, the flat metal sheet comprises a titanium or titanium carbide material. In some embodiments, the cathode cage further comprises slots at the corners of the cage. These slots may be formed by laser cutting. The cathode cage 216 includes a reduced area corresponding to the pocket portion 218 defined by the length $X_2$ and the width $Y_2$. Accordingly, $X_1$ is greater than $X_2$ and $Y_1$ is greater than $Y_2$. In the example shown, the flange 220 is flexed flat relative to the pocket portion 218 to dictate the $X_1/X_2$ and $Y_1/Y_2$ dimensions and the depth of the pocket portion. In some embodiments, the area defined by $X_2$ and $Y_2$ is indicative of the etching area where a plurality of holes 227 are formed. Lengths $X_1/X_2$ and widths $Y_1/Y_2$ may vary based upon the operating requirements of the electrochemical cell 100 or battery stack 1000.

In some embodiments, the flange 220 includes a surface adjacent to and contacting the front surface 212 of the bipolar electrode plate and a depth of the pocket portion 218 extends from the flange in a direction away from the front surface of the electrode plate. The pocket portion 218 of the cathode cage operates cooperatively with the front surface of the electrode plate to form a chamber in which the loaded carbon felt 224 is situated. In some of these embodiments, the cathode cage is disposed on the front surface of the electrode plate at its flange by welding, use of an adhesive, use of a mechanical fastener, or any combination thereof.

The cathode cage is formed of a metal, metal alloy, or plastic that is substantially inert to the electrolyte of the electrochemical cell or battery stack. In some embodiments, the cathode cage is stamped from a titanium material (e.g., titanium or titanium oxide). In other embodiments, the cathode cage comprises a titanium material that is coated with a titanium carbide material.

In some embodiments, the pocket portion of the cathode cage is chemically-etched to form a plurality of spaced holes 227. In some embodiments, the holes are sized and spaced to form a hole pattern (e.g., a modulated hole pattern) that increases the uniformity of current and/or charge distributed across the cathode cage by compensating for the deformation or bending of the pocket portion of the cathode cage that occurs during operation (e.g., charging or discharging) of the electrochemical cell.

Figure 7A:
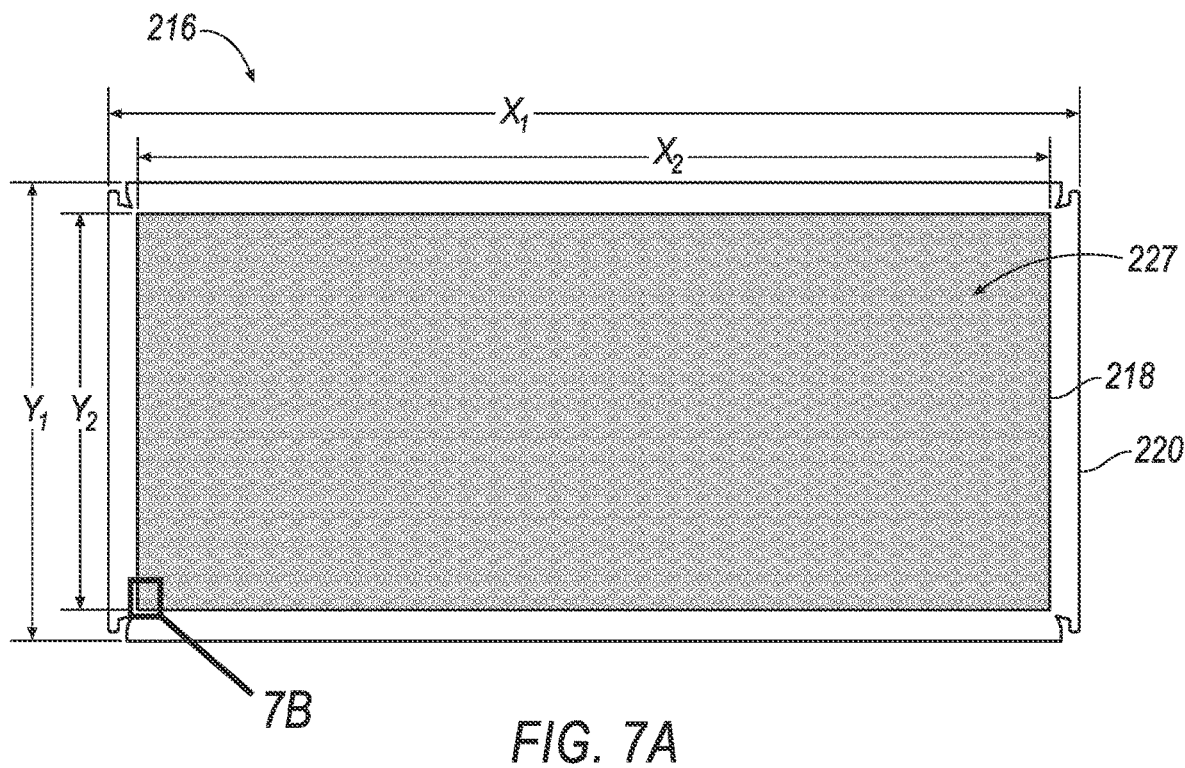
FIGS. 7A and 7B show a front view of a cathode cage and a magnified view of a cathode cage material having holes therethrough, respectively, according to an embodiment of the present invention.
Figure 7B:
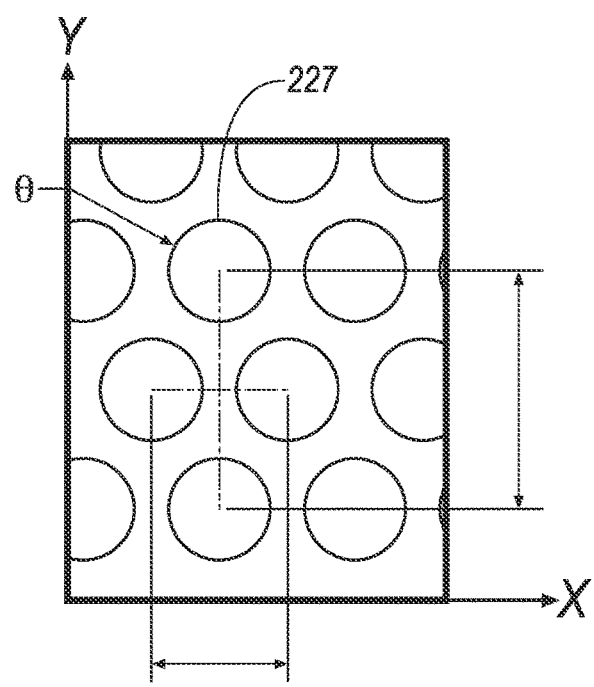
Figure 8:
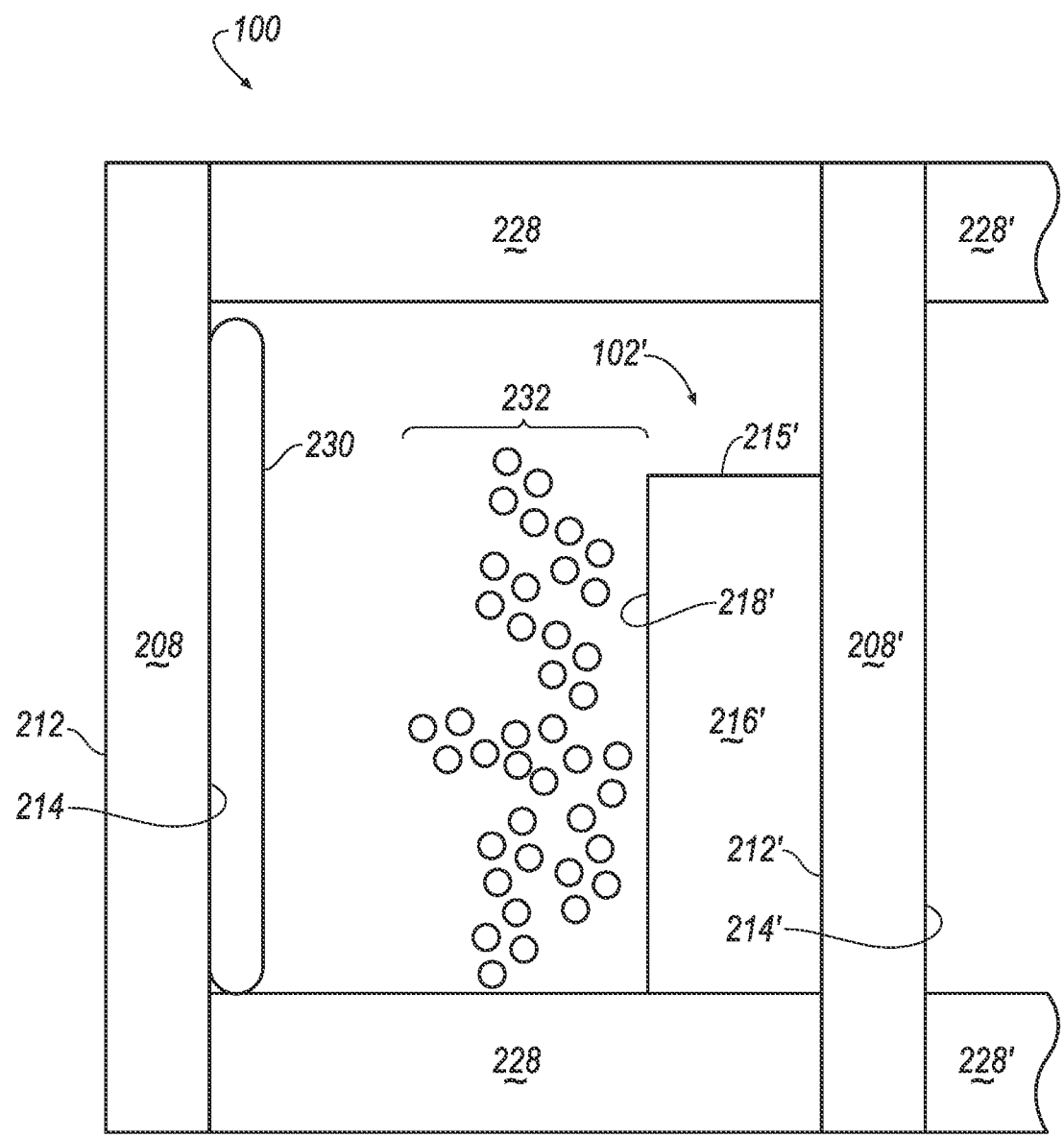
FIG. 8 shows a cross-sectional view of a portion of an electrochemical cell including an interface between a front surface of a bipolar electrode plate (including the cathode assembly mounted thereon) and the back surface of a second electrode plate or an inner surface of a terminal endplate according to an embodiment of the present invention.
Figure 9:
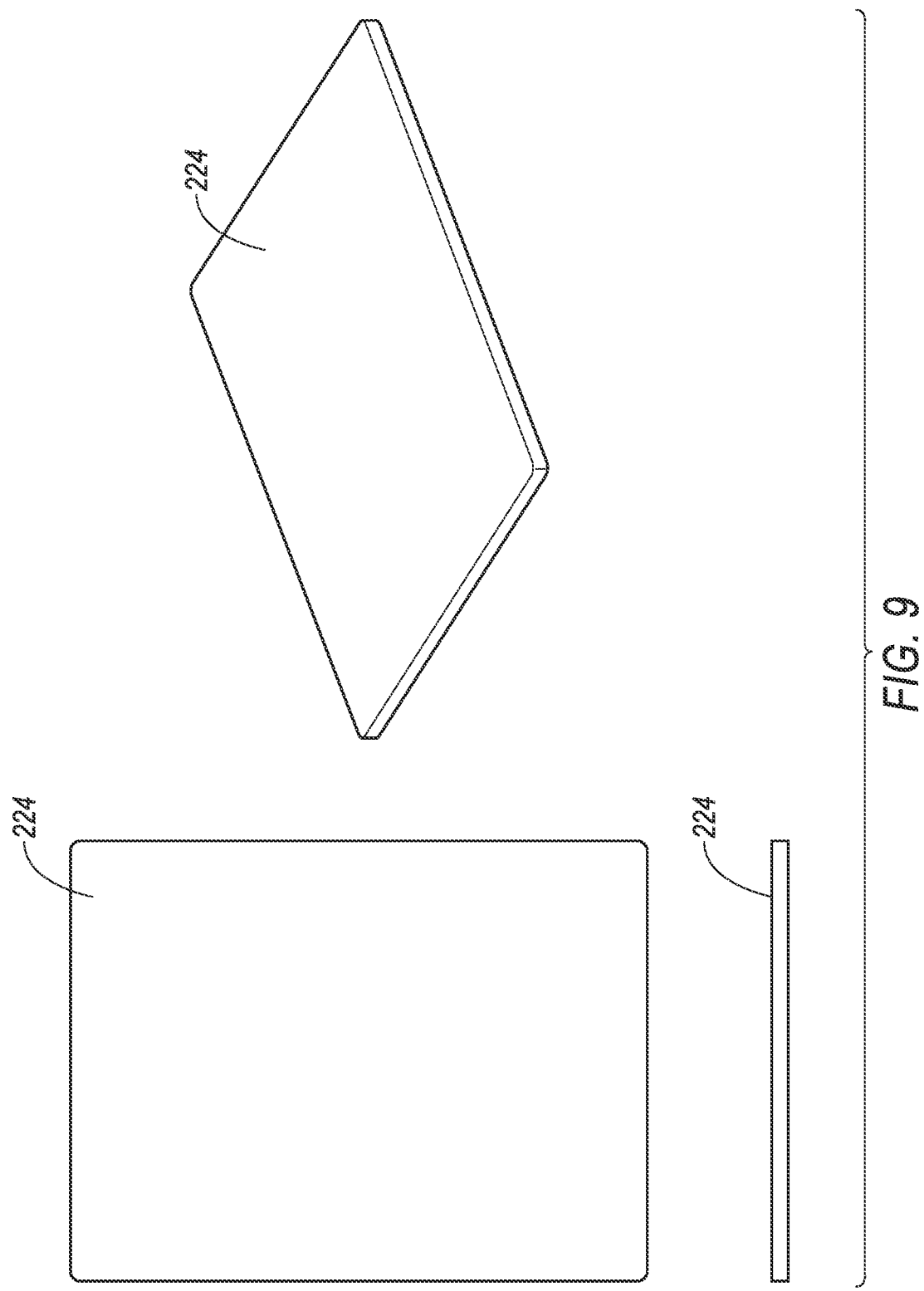
FIG. 9 shows a front, side, and top perspective view of a loaded carbon felt for use as a cathode according to an embodiment of the present invention.

FIG. 7A illustrates the front view of the cathode cage 216 depicted by FIG. 6A, including the plurality of holes 227 formed through the chemically-etched surface of the pocket portion 218 by chemical etching. FIG. 7B is a detailed view of a portion illustrated by FIG. 7A showing a distribution of the plurality of holes 227. The chemical etching process is a subtractive manufacturing process that eliminates solid material that is to be removed for forming the plurality of holes 227. During the first step of the chemical etching process, the cathode cage 216 begins as a flat metal sheet that is cut using a shear to achieve dimensions corresponding to $X_1$ and $Y_1$. Next, the metal sheet may be cleaned and coated with a dry film solder mask in a hot roll laminator and then cooled in a dark environment. A protective film may then be applied within a vacuum exposure unit to expose the metal sheet. In some examples, the magnitude of exposure may be measured using a step indicator, and the exposure is determined when a desired magnitude of exposure is achieved. Subsequently, the metal sheet is run through a developer to remove the protective film while a resolve detergent in the developer is applied to the metal sheet to remove unwanted, unexposed resist. The metal sheet may then be placed in a furnace rack and baked at a predetermined temperature for a predetermined period of time. For instance, the baking temperature may be about 250° F. for about 60 minutes. Following the baking cycle, each metal sheet is air-cooled, and a chemical etching device is programmed for specifications of the desired etching area, e.g., the area defined by $X_2$ and $Y_2$, and the baked and cooled metal sheet is run through the chemical etching device to remove the unwanted material and thereby form the holes 227.

Referring now to FIG. 7B, the plurality of holes 227 are spaced and distributed along rows in a pattern. In some embodiments, the pattern is an alternating repeating pattern. In some embodiments, the pattern is selected to permit a uniform distribution of current across the cathode cage 216 in the presence of the cathode cage bending and deforming from flat during charging of the electrochemical cell or battery stack. Also referring to FIGS. 30A-31C, providing the cathode cage with a hole pattern in accordance with the present invention enhances the uniform distribution of charge and/or current which generates a more uniform plating of zinc metal at the anodic surface (e.g., the back surface 214 of a bipolar electrode plate, or the inner surface 318 of an endplate, or both surfaces) of the bipolar electrode plate during charge cycles. Likewise, conversions between bromine and bromide anions at or near the cathode cage 216 may also be enhanced. In some embodiments, the spacing between each hole of the plurality of holes 227 along the rows in the x-direction, the spacing between the alternating rows in the y-direction, and the diameter, $\varphi$, of the holes may be selected to achieve a substantially uniform distribution of charge and/or current across the cathode cage 216 based on the amount of bend or deformation that results in the cathode cage and the bipolar electrode the when the electrochemical cell or battery stack undergoes charging and discharging. In some implementations, the distribution of the x and y hole locations (e.g., spacing) in each of the x and y directions is based upon a nominal hole area and a recommended web length of the cathode cage 216. The thickness of the surface of the pocket portion 218 may dictate the dimensions of the nominal hole area and the recommended web length. In some examples, the center of the adjacent plurality of holes 227 along a row are spaced by about 0.067 cm in the x-direction and every other row is spaced by about 0.152 cm in the y-direction. As described in greater detail below, the cathode cage 216, and the bipolar electrode plate 208, 208', or the terminal endplate 302 will bend greater distances from flat at regions further from the perimeter at each of the parts resulting in the spacing between the anode and cathode electrodes to be shorter at the center regions with respect the outer regions near the perimeter. Generally, as the spacing between the anode and cathode electrodes decreases, the calculated hole diameter at corresponding x and y hole locations will increase.

In some embodiments, the spacing between the electrodes (e.g., between the cathode cage 216 and the back surface 214 or the inner surface 318 of the bipolar electrode plate 208, 208', 302) is calculated at each of the plurality of evenly distributed x and y hole locations along the etching area (e.g., area defined by $X_2$ and $Y_2$) of the cathode cage. An x-y origin can include the lower left boundary of the pocket portion 218 shown in FIG. 7B where the x- and y-axis intersect. Thereafter, the hole area for each of the plurality of holes 227 may be calculated based on the calculated spacing between the cathode and anode electrodes at each of the x and y locations, a predetermined minimum spacing between the electrodes, and the nominal hole area. In some embodiments, the number of the plurality of holes 227 can be further based upon the thickness of the surface of the pocket portion 218 of the cathode cage 216. In some examples, the predetermined minimum spacing is about 7.45 mm and the nominal hole area is about 1.08 mm². In some implementations, calculating the spacing between the anode and cathode electrodes at each of the plurality of x and y locations along the etching area is calculated using the following fit equation:

$$f = y0 + a*x + b*y + c*x^2 + d*y^2 \qquad [1].$$

The coefficients for the fit equation of Eq. [1] may be determined by measuring a delta from flat for each cathode cage 216 and, the electrode plate 208' or terminal endplate 302 for each of bipolar electrodes. The measurement is taken from the plurality of x and y hole locations across each of the cathode cage 216 and corresponding locations at the electrode plate 208'. An average is calculated for each of the plurality of bipolar electrodes 102, for both the cathode cage 216, and the electrode plate 208' or the terminal endplate 302, at each location. Data corresponding to the calculated averages is utilized to determine the coefficients y0, a, b, c, and d for each of the cathode cage and the electrode plate. In some embodiments, the direction of the delta for each of the two electrodes is adjusted so that the flat distance between the two is a desired spacing, e.g., about 10.0 mm, and the delta for the electrode plate extends up from about 0 mm and the delta for the cathode cage extends down from about 10.0 mm. Accordingly, the coefficients determined for each of the electrode plate and the cathode cage are as follows:

Electrode Plate/Terminal Endplate
y0=−1.5787
a=0.8948
b=2.4920
c=−0.1268
d=−0.9132
e=0.0000
Cathode Cage
y0=10.8602
a=−0.5295
b=−1.5860
c=0.0814
d=0.6857
e=0.0000

New coefficients put into the fit equation of Eq. [1] may be determined by subtracting the anode coefficients from the cathode coefficients. Accordingly, the new coefficients for input into Eq. [1] are as follows:

y0=12.4389
a=−1.4243
b=−4.078
c=0.2082
d=1.5989
e=0.0000

The x and y hole locations must be normalized by the etching area before being input to Eq. [1] for calculating the spacing of the plurality of holes 227. For instance, each x location is divided by the length, $X_2$, of pocket portion 218 and each y location is divided by the width, $Y_2$, of the pocket portion. Thereafter, each normalized x and y hole location, along with the new coefficients determined above, are input to Eq. [1] to determine the spacing between the anode and the cathode electrodes at each x and y hole location. The fit equation of Eq. [1] is a non-linear three-dimensional paraboloid equation. In some implementations, Eq. [1] is executed using SigmaPlot™ software licensed by Systal Software, Inc.

In some implementations, the area of each hole of the plurality of holes 227 at each x and y location may be calculated as follows:

$$\varphi_{x,y} = f \times \frac{A_{nominal}}{S_{nominal\_minimum}} \qquad [2]$$

wherein
$\varphi_{x,y}$ is the calculated diameter at each hole location,
f is the spacing between the electrodes at each hole location calculated utilizing Eq. 1,
$A_{nominal}$ is the nominal hole area, and
$S_{nominal\_minimum}$ is the nominal minimum hole spacing.

In some examples, the nominal hole area is about 1.08 mm² and the nominal minimum spacing is about 7.45 mm². The examples for calculating the hole diameter utilize mixed units, wherein inches are utilized for each of the x and y hole locations and the etching area defined by $X_2$ and $Y_2$ while millimeters are utilized for calculating the spacing between the electrodes. Equation [2] demonstrates that the hole diameter increases as the spacing between the anode and cathode electrodes increases. The average hole diameter calculated at each hole location utilizing Eq. 2 for each of the bipolar electrodes 102, 102' is averaged. Implementations include utilizing the average hole diameter for the plurality of holes 227 formed in the cathode cage 216 for each of the plurality of bipolar electrodes 102, 102'.

Figure 10:
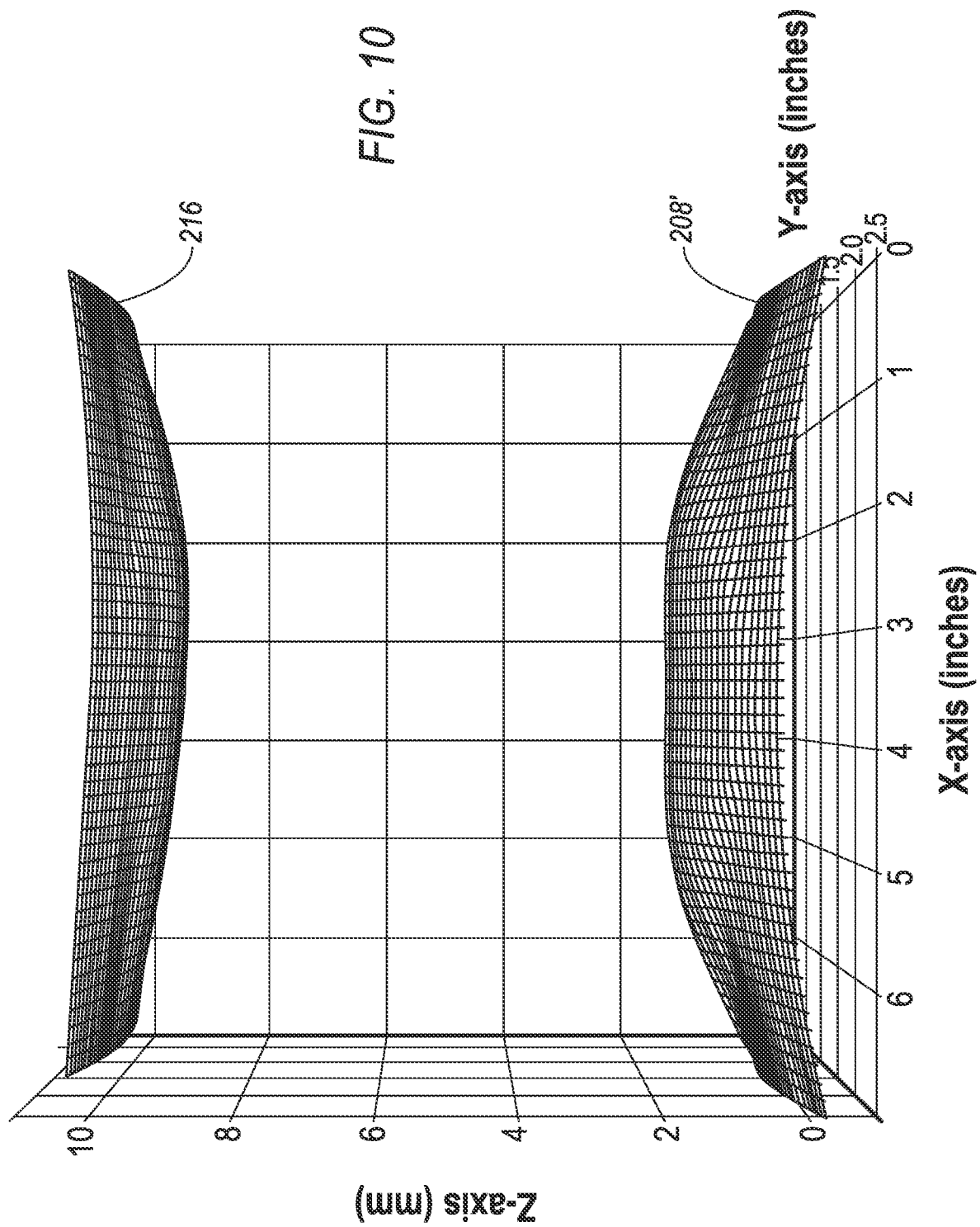
FIG. 10 illustrates experimental data of spacing between the three-dimensional shape profiles of a bipolar electrode plate and cathode cage with respect to the Z-axis and X-axis according to an embodiment of the present invention.
Figure 11:
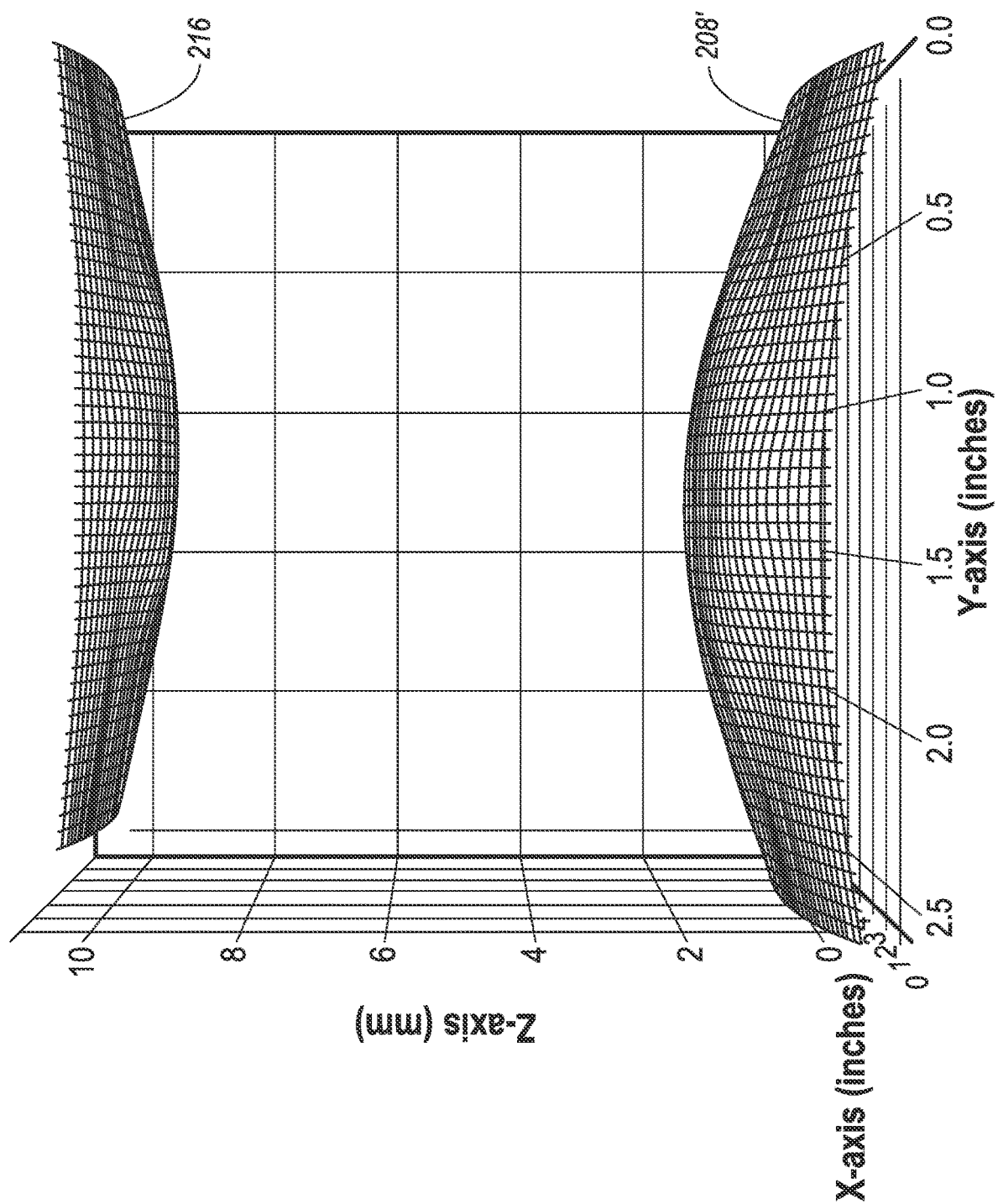
FIG. 11 illustrates experimental data of spacing between the three-dimensional shape profiles of a bipolar electrode plate and cathode with respect to the Z-axis and the Y-axis according to an embodiment of the present invention.
Figure 12:
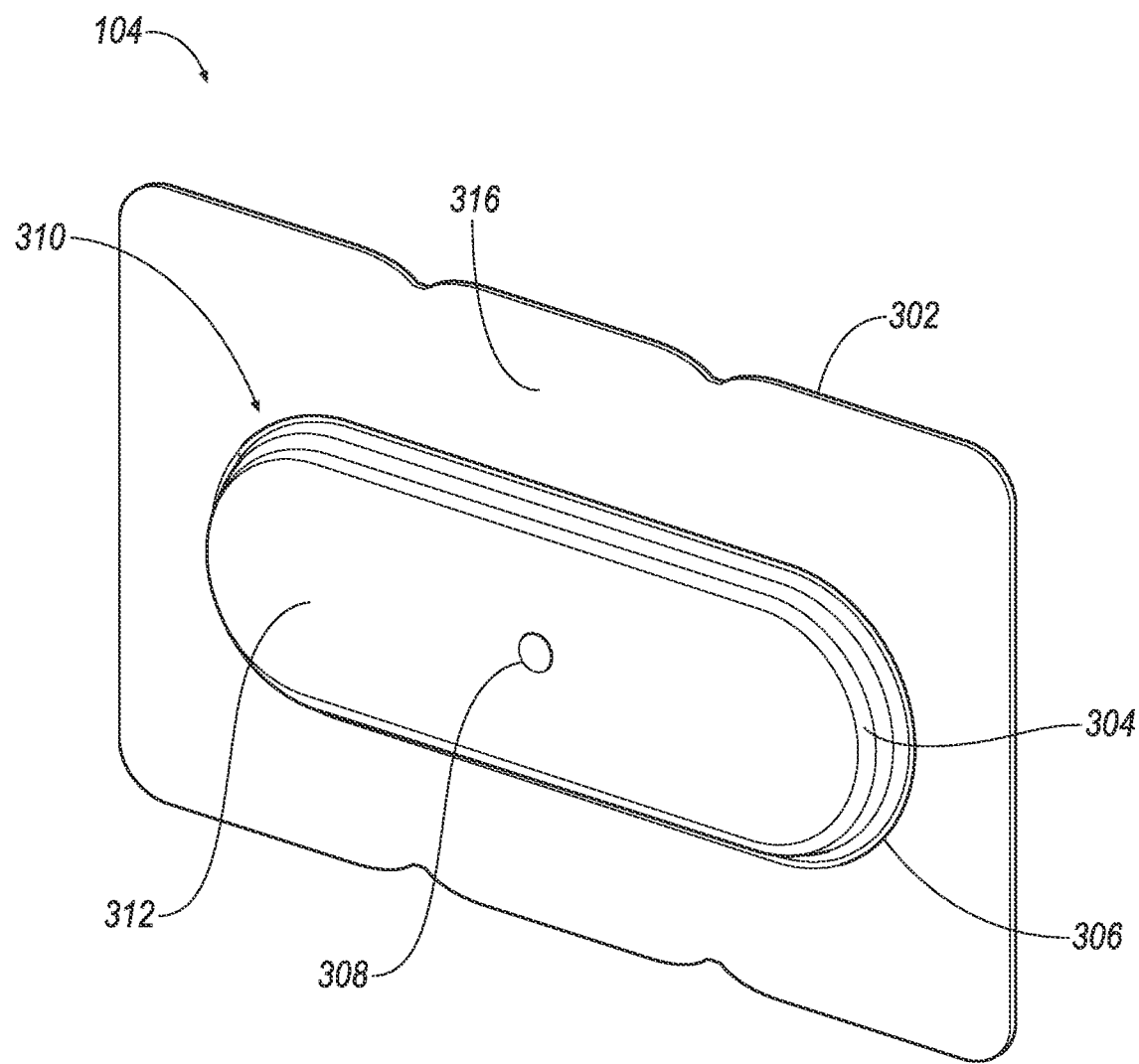
FIG. 12 shows a perspective view of a terminal assembly according to an embodiment of the present invention.

FIGS. 10 and 11 illustrate experimental data of average spacing between three dimensional shape profiles of the bipolar electrode plate 208' and the cathode cage 216 with respect to the x-axis (FIG. 10) and the y-axis (FIG. 11). The experimental data illustrates an average taken from twenty bipolar electrodes 102, 102' of the battery module 1000. The electrode plate 208' and the cathode cage 216 bend from flat when charged. In the example shown, the cathode cage and the electrode plate are arranged such that the spacing between the cathode cage and the electrode plate from flat is about 10 mm with respect to the z-axis. The electrode plate has a largest delta from flat of about 1.566 mm along the z-axis at direct center (e.g., about 3.5 mm with respect to the x-axis) and the cathode cage has a largest delta from flat of about 0.565 mm along the x-axis at right-center (e.g., about 2.0 mm with respect to the x-axis). An average electrode separation from left-center to right-center of plurality of bipolar electrodes is about 7.78 mm.

i.b. Adhesive or Glue

Figure 27:
FIG. 27 shows an electrochemical cell as described in Example 3 that comprises a bipolar electrode illustrated in FIG. 26.

In addition to the cathode cage, or instead of a cathode cage, an adhesive or glue may be applied to the bipolar electrode plate and used to hold the loaded carbon felt in contact with the bipolar electrode plate. FIGS. 26 and 27 show alternate embodiments where the bipolar electrode and electrochemical cell are constructed, without a cathode cage, using adhesive to attach the loaded carbon felt to the cathode side of the bipolar electrode plate. And, the electrochemical cell in FIG. 27 lacks any graphite plates that are in electrical communication with the cathode side of the bipolar plate.

As discussed above and throughout, an adhesive may be used to attach the loaded carbon felt to the bipolar electrode plate. In some embodiments, a volume (e.g., 5 ml) of the adhesive is applied to the cathode surface of the bipolar electrode and the loaded carbon felt is placed on top of the adhesive and pressure (e.g., 5 psi) is applied to the top of the loaded carbon felt and the adhesive or glue is then dried (e.g., for 1 hour). The adhesive may then hold the loaded carbon felt on the face of the bipolar electrode plate. The loaded carbon felt may have a substantially rectangular shape and may be approximately centered and aligned with a substantially rectangular bipolar electrode plate.

ii. Loaded Carbon Felt

The loaded carbon felt 224 is in electrical communication with the front surface 212, 212' of the bipolar electrode plate 208, 208' and is confined by the cathode cage 216, 216' and the front surface 212, 212' of the bipolar electrode plate. Loaded carbon felts are described above and throughout. The loaded carbon felt can reversibly absorb aqueous bromine species (e.g., aqueous bromine or aqueous bromide) (collectively 702) and is substantially chemically inert in the presence of the electrolyte.

In some embodiments, the loaded carbon felt is made into a size and shape such that the loaded carbon felt can be at least partially nested by the cathode cage. In some embodiments, the loaded carbon felt is made into a size and shape such that the loaded carbon felt can be at least partially nested by the frame.

2. Terminal Assembly

Another aspect of the present invention provides a terminal assembly for a bipolar electrochemical cell or a battery. Referring to FIGS. 12-17, a terminal assembly 104 of the present invention comprises a conductive cup-shaped member 310 that comprises a terminal wall 312, a sidewall 304, and a rim 306 that is separated from the terminal wall by the sidewall. A terminal 308 of the bipolar electrochemical cell or battery stack is connected for electrical communication with the terminal wall 312 of the conductive cup-shaped member 310. In some embodiments, the terminal 308 comprises brass (e.g., the terminal is a brass plug that electrically communicates or contacts the terminal wall). In some embodiments, a portion of the terminal wall 312 in contact with the terminal 308 comprises copper. In these embodiments, the terminal wall may be formed from titanium and include a copper plate operative to contact and electrically connect the terminal formed from copper to the terminal wall of the conductive cup-shaped member.

The terminal assembly further comprises a terminal endplate 302 having inner and outer surfaces 318, 316 at least substantially coplanar with the terminal wall and joined to the rim at the outer surface 316. The terminal endplate 302 may be formed to comprise any of the features present in the bipolar electrode plate, including without limitation, a titanium material that is coated with a titanium carbide material, thru holes, rough inner surface, or the like. The rim of the cup-shaped member joins to the terminal endplate 302 such that the rim is approximately centered about the electrochemically active region 322 of the terminal endplate. In some embodiments, the electrochemically active region 322 corresponds to a region extending between the inner and outer surfaces of the terminal endplate in chemical or electrical communication with the adjacent bipolar electrode during charge and discharge cycles of the electrochemical cell or battery stack. In these embodiments, the electrochemically active region for the terminal endplate associated with the negative cathode terminal of the battery corresponds to or is defined by an area enclosed by a cathode assembly disposed upon the inner surface of the terminal endplate (e.g., the terminal cathode endplate). The electrochemically active region for the terminal endplate associated with the positive anode terminal of the battery may correspond to an area on its inner surface that opposes a cathode assembly disposed on the front surface of an adjacent bipolar electrode plate and forms a layer of zinc metal upon charging of the battery (terminal anode assembly). In some embodiments, at least a portion of the inner surface (e.g., at least the chemically active region) of the terminal endplate of the terminal anode assembly is a rough surface.

Figure 14:
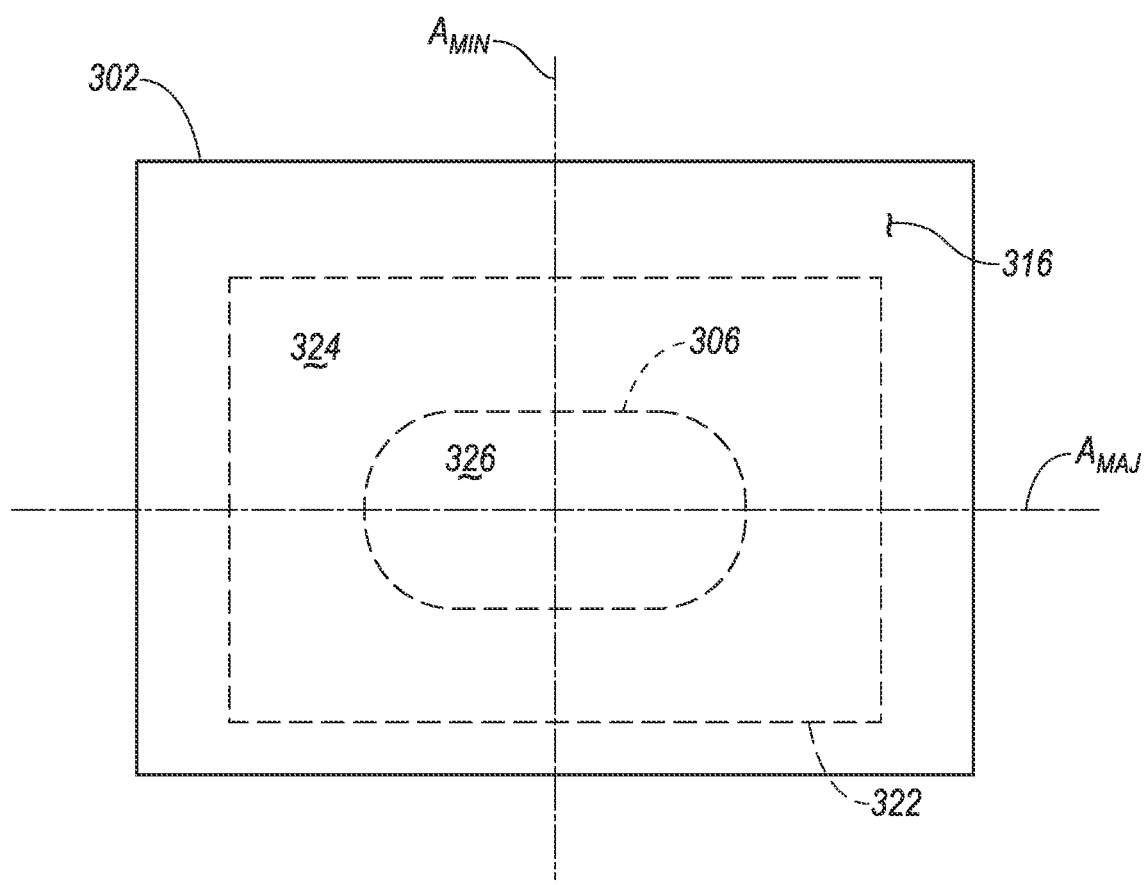
FIG. 14 shows a top view of the endplate of the terminal assembly of FIG. 13 having an electrochemically active region comprising a first surface area enclosed by the rim of the conductive cup-shaped member and a remaining second surface defined by an outer periphery of the rim and peripheral edges of the electrochemically active region according to an embodiment of the present invention.

FIG. 14 provides a top view of the terminal endplate showing the electrochemically active region of the terminal endplate comprising a first surface area 326 enclosed within dashed ellipse 306 corresponding to the outer periphery of the rim and a remaining second surface area 324 defined by the outer periphery of the rim 306 and the peripheral edges of the electrochemically active region 322. The conductive cup-shaped member 310 is removed for clarity in FIG. 14 so that the first surface area can be shown. Thus, the first surface area is enclosed by the rim when the conductive cup-shaped member is joined to the outer surface of the terminal endplate. The first 326 and second 324 surface areas are substantially equal.

Figure 13:
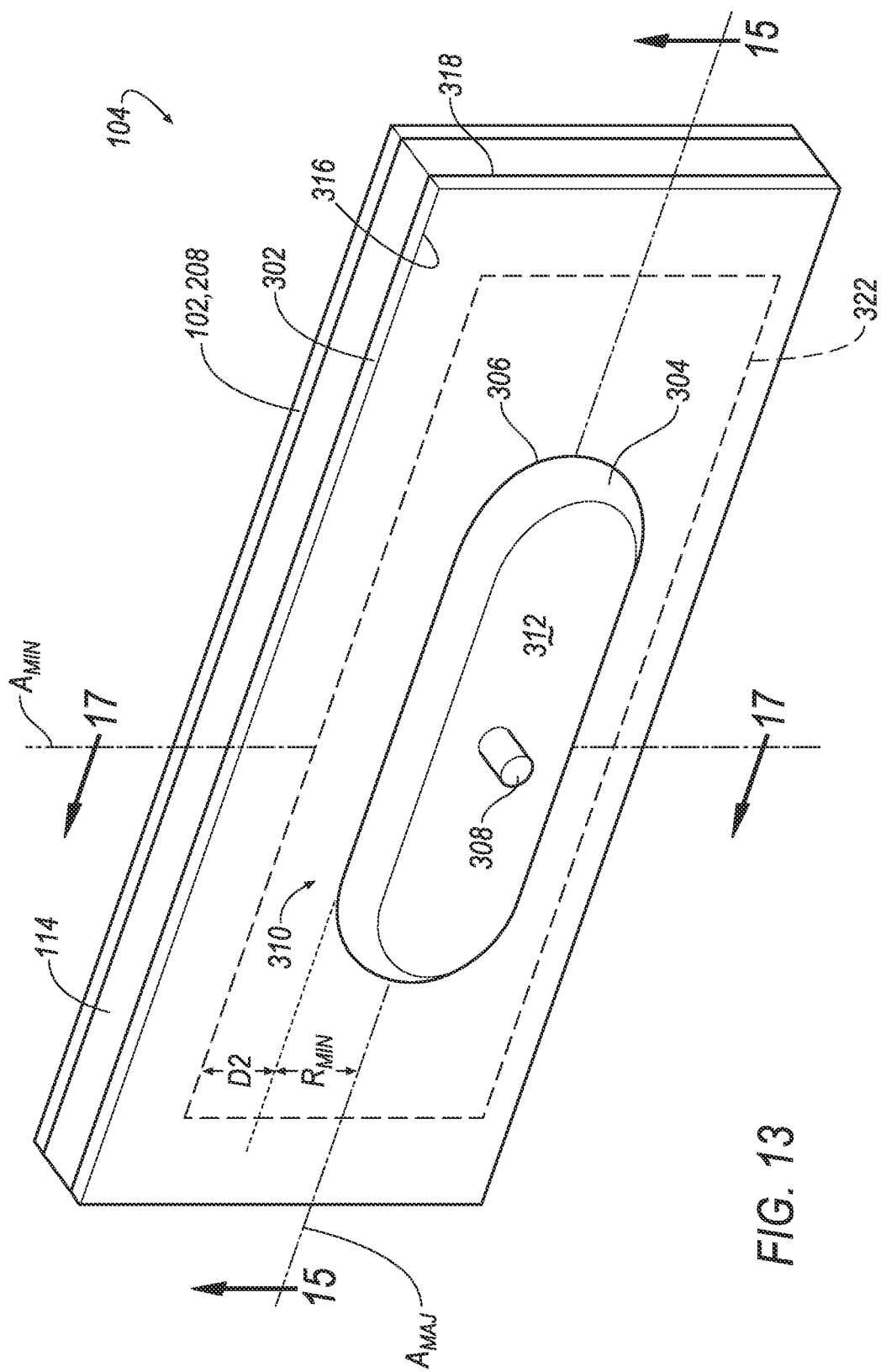
FIG. 13 shows a top perspective view of a terminal assembly for a bipolar battery comprising a terminal endplate and a conductive cup-shaped member having a substantially elliptical rim joined to the endplate according to an embodiment of the present invention.
Figure 15:
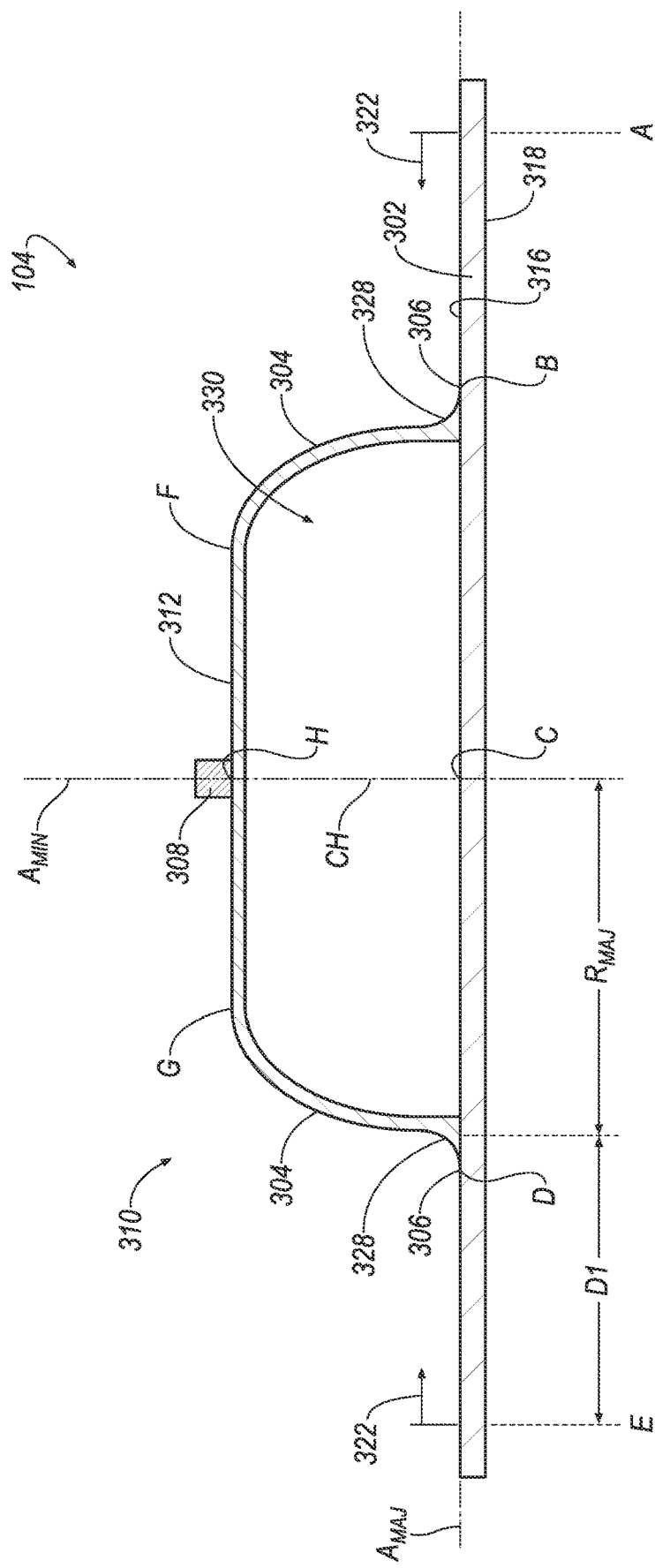
FIG. 15 is a cross-sectional view taken along line 17-17 of FIG. 13 showing the conductive cup-shaped member and a remaining second surface defined by an outer periphery of the rim and peripheral edges of the electrochemically active region according to an embodiment of the present invention.

In some embodiments, the rim is substantially elliptical and defined by a major axis $A_{MAJ}$ and a minor axis $A_{MIN}$ perpendicular to the major axis, the major axis and the minor axis intersecting at a center of the rim and also the center of the electrochemically active region. As used herein, the substantially elliptical rim refers to the rim having a substantially rectangular shape with radiused, or otherwise curved and rounded corners. In some embodiments, the rim is substantially rectangular. FIG. 15 provides a cross-sectional view taken along line 15-15 of FIG. 13 showing a major radius $R_{MAJ}$ of the rim being substantially equal to a first distance D1 extending along the major axis from the outer periphery of the rim to a peripheral edge of the electrochemically active region that is parallel to the minor axis; and FIG. 13 shows a minor radius $R_{MIN}$ of the rim is substantially equal to a second distance D2 extending along the minor axis from the outer periphery of the rim to a peripheral edge of the electrochemically active region that is parallel to the major axis.

In some embodiments, the rim defines an opening of an interior region 330 defined by interior surfaces of the terminal wall and the sidewall, and the outer surface of the terminal endplate enclosing the opening of the interior region when joined to the rim.

In some embodiments, the rim is centered within the electrochemically active region of the endplate. In some embodiments, the rim is substantially circular or substantially elliptical.

In some embodiments, the sidewall is perpendicular or substantially perpendicular to the terminal wall and the rim. In other embodiments, the sidewall extends radially outward from the terminal wall to the rim.

Figure 16:
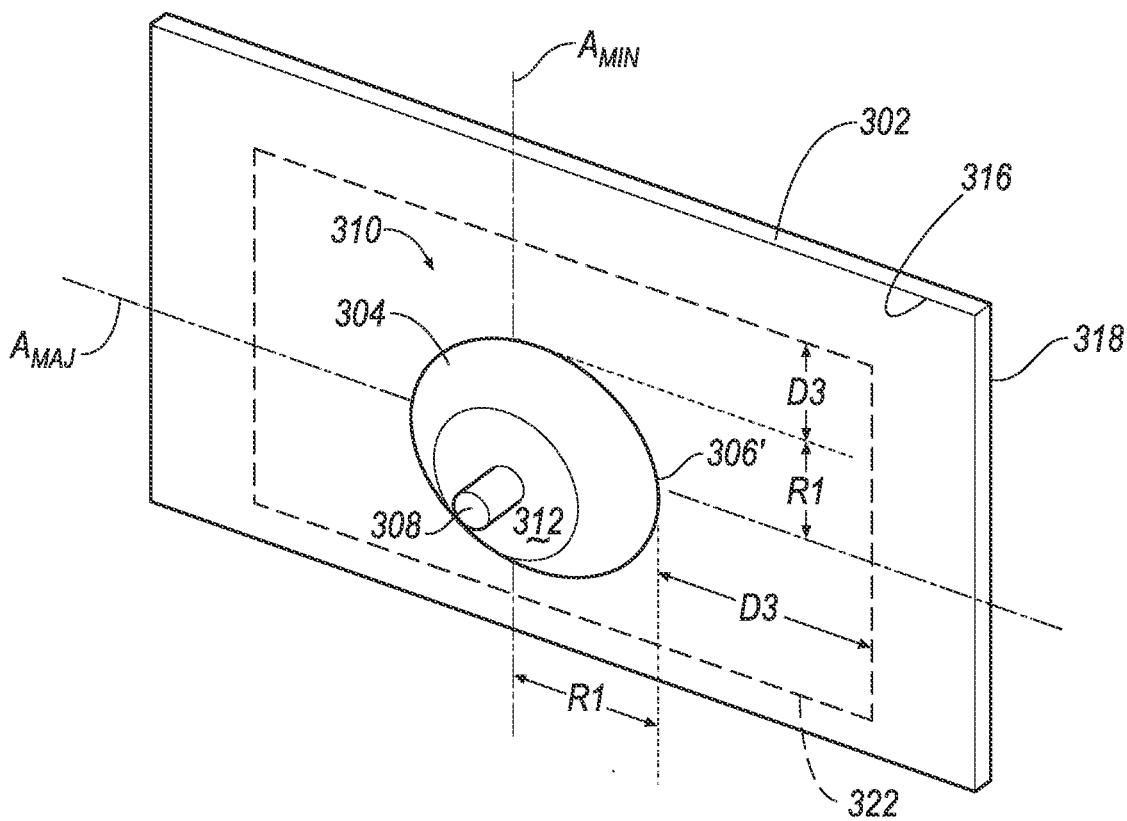
FIG. 16 is a top perspective view of the terminal assembly of FIG. 13 showing the bipolar endplate and the conductive-cup shaped member comprising a substantially circular rim according to an embodiment of the present invention.

In some embodiments, the rim is substantially circular. For example, FIG. 16 provides a top perspective view of the terminal assembly comprising the conductive cup-shaped member that comprises the terminal wall, the sidewall, and a substantially circular rim 306' that is separated from the terminal wall by the sidewall. In these embodiments, a radius R1 of the rim is substantially equal to a distance D3 between peripheral edges of the electrochemically active region 322 and the outer periphery of the rim.

Figure 17:
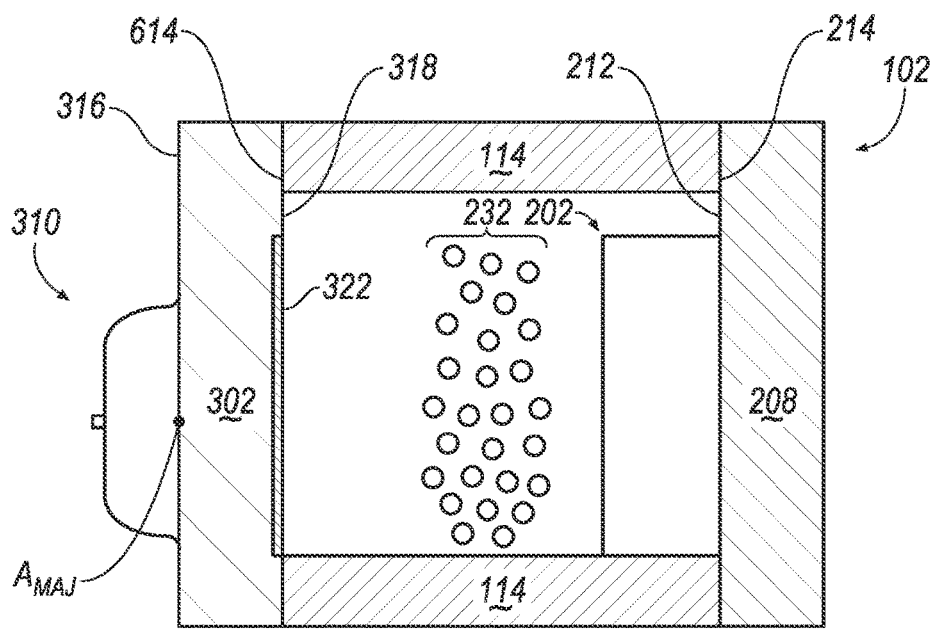
FIG. 17 is a cross-sectional view taken along line 15-15 of FIG. 13 showing the terminal assembly further comprising a frame member opposed to and receiving a second surface of the terminal endplate on a side opposite the conductive cup-shaped member according to an embodiment of the present invention.
Figure 23:
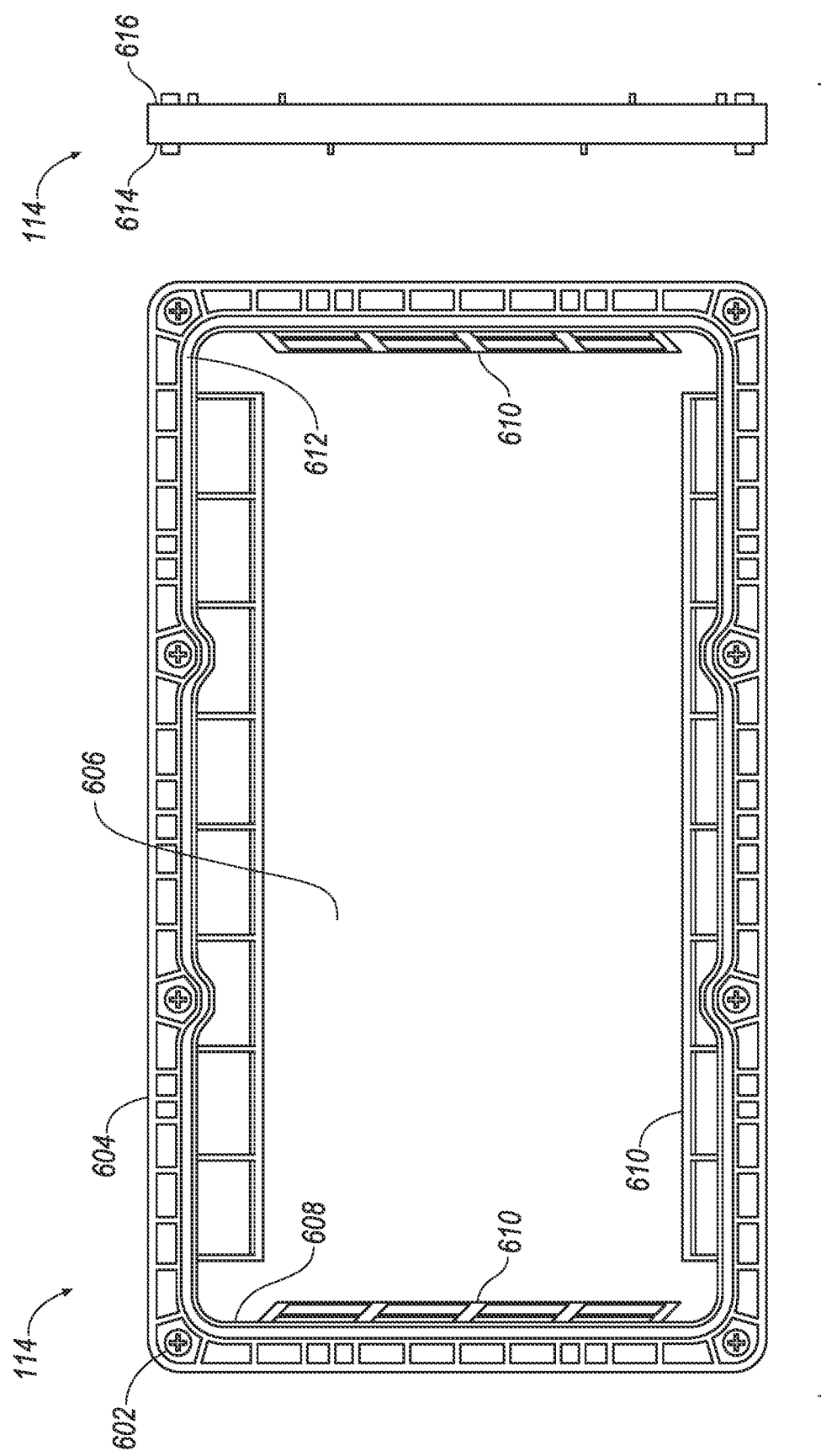
FIG. 23 shows a front view and side view of a frame for use in the battery stack of FIG. 18 according to an embodiment of the present invention.

Referring to FIG. 17, a cross-sectional view taken along 17-17 of FIG. 13 shows the terminal assembly comprising the conductive cup-shaped member, the terminal endplate, an optional frame member 114, and a bipolar electrode that is immediately adjacent to the terminal assembly wherein the bipolar electrode comprises a cathode assembly 202 and a bipolar electrode plate 208. Referring to FIGS. 17 and 23, in some embodiments, the frame member 114 comprises a first side 614 and a second side 616, the first side opposed to and receiving the inner surface 318 of the terminal endplate 302 on a side opposite the conductive cup-shaped member 312. In some of these embodiments, the second side of the frame member opposes the cathode assembly 202 of the bipolar electrode, and the bipolar electrode comprises a bipolar electrode plate 208 comprising a front surface 212 fastened to the second side 616 of the frame member; and a cathode assembly 202 situated on the front surface of the bipolar electrode plate, the cathode assembly interposed between the front surface of the bipolar electrode plate and the inner surface of the terminal endplate. In some embodiments, the electrochemically active region 322 situated at the inner surface of the terminal endplate opposes the cathode assembly situated on the front surface of the bipolar electrode plate and includes a size and shape that is substantially the same as a size and shape of the cathode assembly. Discussed in greater detail above with reference to FIGS. 3 and 4B, the cathode assembly 202 comprises a cathode cage 216 and a loaded carbon felt 224 situated on the front surface 212, 212' of the bipolar electrode plate. Alternatively, as shown in FIGS. 26 and 27, the cathode assembly comprises a loaded carbon felt and an adhesive or glue on the front surface of the bipolar electrode plate (i.e., with no cathode cage).

In some embodiments, the terminal assembly is a terminal cathode assembly, wherein the terminal cathode assembly comprises a terminal endplate 302 having an electrochemically active region, a conductive cup-shaped member such as any of the cup shaped members described herein disposed on the outer surface of the terminal endplate and approximately centered in the electrochemically active region, and a cathode assembly such as any of the cathode assemblies described herein disposed on the inner surface of the terminal endplate.

In some embodiments, the terminal assembly comprises a terminal anode assembly, wherein the terminal anode assembly comprises a terminal endplate having an electrochemically active region, a conductive cup-shaped member such as any of the cup shaped members described herein disposed on the outer surface of the terminal endplate and approximately centered in the electrochemically active region, and wherein the terminal anode assembly lacks a cathode assembly.

In some embodiments, the rim of the conductive cup-shaped member is joined to the outer surface of the terminal endplate by a weld or an adhesive. In some instances, the adhesive is electrically conductive. Examples of suitable electrically conductive adhesives include graphite filled adhesives (e.g., graphite filled epoxy, graphite filled silicone, graphite filled elastomer, or any combination thereof), nickel filled adhesives (e.g., nickel filled epoxy), silver filled adhesives (e.g., silver filled epoxy), copper filled adhesives (e.g., copper filled epoxy), any combination thereof, or the like.

In some embodiments, the conductive cup-shaped member is composed of at least one of a copper alloy, a copper/titanium clad, aluminum, and electrically conductive ceramics. For instance, the interior surfaces of the terminal wall and the sidewall comprise copper. In other instances, the exterior surfaces of the terminal wall and the sidewall comprise at least one of copper, titanium, and electrically conductive ceramics.

In some embodiments, at least one of the conductive cup-shaped member or the terminal endplate comprises titanium. In some embodiments, at least one of the conductive cup-shaped member or the terminal endplate comprises a titanium material coated with a titanium carbide material.

In some embodiments, the conductive cup-shaped member comprises a first metal and the endplate comprises a second metal.

In some embodiments, the rim comprises a flange 328 (FIG. 15) extending radially outward from the sidewall.

Referring again to FIG. 15, electrical properties of an exemplary terminal assembly for a zinc-halide electrochemical cell or battery stack during its operation (e.g., charging or discharging) are generalized according to the following expressions:

$$V_A \approx V_E \approx V_C \qquad \text{exp. 1}$$

$$V_D \approx V_B \qquad \text{exp. 2}$$

$$V_F \approx V_G \qquad \text{exp. 3}$$

$$\Delta V_{G-D} \approx \Delta V_{F-B} >> \Delta V_{H-G} \approx \Delta V_{F-H} \qquad \text{exp. 4}$$

$$\Delta V_{G-D} \approx \Delta V_{F-B} >> \Delta V_{B-C} \approx \Delta V_{D-C} \qquad \text{exp. 5}$$

B and D identify two electrical points of contact between the rim of the cup-shaped member and the first surface of the bipolar endplate. H represents the center of inversion of symmetry for the conductive cup-shaped member, and C represents the superposition of H onto the first surface of the bipolar endplate such that the line CH extending along the minor axis $A_{MIN}$ and joining C and H is normal to the first surface of the endplate. F and G identify junctions where the terminal wall 312 and the sidewall 304 meet, and A and E identify opposing peripheral edges of the electrochemically active region 322.

The charge at A, $V_A$, is approximately equal to the charges at E, $V_E$, and C, $V_C$. The charge at D, $V_D$, is approximately equal to the charge at B, $V_B$. The charge at F, $V_F$, is approximately equal to the charge at G, $V_G$. The electrical potential difference, or voltage from G to D, $\Delta V_{G-D}$, is approximately equal to the voltage from F to B, $\Delta V_{F-B}$, the voltage from H to G, $\Delta V_{H-G}$ is approximately equal to the voltage from F to H, $\Delta V_{F-H}$, and $\Delta V_{G-D}$ and $\Delta V_{F-B}$ is substantially greater than $\Delta V_{H-G}$ and $\Delta V_{F-H}$. And, the voltages $\Delta V_{G-D}$ and $\Delta V_{F-B}$ are substantially greater than the voltages from B to C, $\Delta V_{B-C}$, and D to C, $\Delta V_{D-C}$.

Because the voltages from G to D and from F to B, i.e., $\Delta V_{G-D}$ and $\Delta V_{F-B}$, are substantially greater than the voltage from H to G and F to H, i.e., $\Delta V_{H-G}$ and $\Delta V_{F-H}$, current discharged from the terminal of the terminal assembly of the present invention is substantially more uniform than discharge current from a traditional bipolar battery having a terminal directly attached to an endplate.

3. Zinc-Halide Electrolyte

In electrochemical cells and battery stacks of the present invention, an aqueous electrolyte, i.e., a zinc-halide electrolyte is interposed between the inner surface of the terminal endplate, the cathode assembly, the front surface of the bipolar electrode, and if present, the interior surfaces of the frame. In these embodiments, bromide anions at the surface of the cathode cage of the cathode assembly that is exposed to the electrolyte are oxidized to bromine when the electrochemical cell or battery stack is charging. Conversely, during discharge, the bromine is reduced to bromide anions. The conversion between bromine and bromide anions 232 at or near the cathode assembly can be expressed as follows:

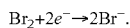

$$Br_2 + 2e^- \rightarrow 2Br^-.$$

The present invention provides an aqueous electrolyte that is useful in flowing or non-flowing (i.e., static) rechargeable zinc halide electrochemical cells or battery stacks. In these cells or battery stacks, zinc bromide, zinc chloride, or any combination of the two, present in the electrolyte, acts as the electrochemically active material.

Any suitable zinc halide electrolyte may be used within the scope of the invention. For example, electrolytes described in PCT Publication No. WO 2016/057477, filed Oct. 6, 2015 and in U.S. application Ser. No. 15/083,558, filed Mar. 29, 2016, both of which are incorporated herein by reference, may be used within the scope of the invention.

One aspect of the present invention provides an electrolyte for use in a secondary zinc bromine electrochemical cell comprising from about 30 wt % to about 40 wt % of $ZnCl_2$ or $ZnBr_2$; from about 5 wt % to about 15 wt % of KBr; from about 5 wt % to about 15 wt % of KCl; and one or more quaternary ammonium agents, wherein the electrolyte comprises from about 0.5 wt % to about 10 wt % of the one or more quaternary ammonium agents.

In some embodiments, the electrolyte comprises from about 4 wt % to about 12 wt % (e.g., from about 6 wt % to about 10 wt %) of potassium bromide (KBr). In some embodiments, the electrolyte comprises from about 8 wt % to about 12 wt % of potassium bromide (KBr).

In some embodiments, the electrolyte comprises from about 4 wt % to about 12 wt % (e.g., from about 6 wt % to about 10 wt %) of potassium chloride (KCl). In some embodiments, the electrolyte comprises from about 8 wt % to about 14 wt % of potassium chloride (KCl). In some embodiments, the electrolyte comprises from about 11 wt % to about 14 wt % of potassium chloride (KCl).

In some embodiments, the aqueous electrolyte comprises from about 25 wt % to about 70 wt % of $ZnBr_2$; from about 5 wt % to about 50 wt % of water; and from about 0.05 wt % to about 10 wt % of one or more quaternary ammonium agents.

In some embodiments, the aqueous electrolyte comprises from about 25 wt % to about 40 wt % of $ZnBr_2$; from about 25 wt % to about 50 wt % water; from about 5 wt % to about 15 wt % of KBr; from about 5 wt % to about 15 wt % of KCl; and from about 0.5 wt % to about 10 wt % of the one or more quaternary ammonium agents.

In some embodiments, the one or more quaternary ammonium agents comprises a quaternary agent selected from the group consisting of ammonium chloride, tetraethylammonium bromide, tetraethylammonium chloride, trimethylpropylammonium bromide, triethylmethyl ammonium chloride, trimethylpropylammonium chloride, butyltrimethylammonium chloride, trimethylethyl ammonium chloride, N-methyl-N-ethylmorpholinium bromide, N-methyl-N-ethylmorpholinium bromide (MEMBr), 1-ethyl-1-methylmorpholinium bromide, N-methyl-N-butylmorpholinium bromide, N-methyl-N-ethylpyrrolidinium bromide, N,N,N-triethyl-N-propyl ammonium bromide, N-ethyl-N-propylpyrrolidinium bromide, N-propyl-N-butylpyrrolidinium bromide, N-methyl-N-butylpyrrolidinium bromide, 1-methyl-1-butylpyrrolidinium bromide, N-ethyl-N-(2-chloroethyl)pyrrolidinium bromide, N-methyl-N-hexylpyrrolidinium bromide, N-methyl-N-pentylpyrrolidinium bromide, N-ethyl-N-pentylpyrrolidinium bromide, N-ethyl-N-butylpyrrolidinium bromide, trimethylene-bis(N-methylpyrrolidinium) dibromide, N-butyl-N-pentylpyrrolidinium bromide, N-methyl-N-propylpyrrolidinium bromide, N-propyl-N-pentylpyrrolidinium bromide, 1-ethyl-4-methylpyridinium bromide, 1-ethyl-2-methylpyridinium bromide, 1-butyl-3-methylpyridinium bromide, cetyltrimethylammonium bromide, cetyltrimethylammonium chloride, cetyltriethylammonium bromide, and any combination thereof.

In some embodiments, the one or more quaternary ammonium agents comprises an alkyl substituted pyridinium chloride, an alkyl substituted pyridinium bromide, an alkyl substituted morpholinium chloride, an alkyl substituted morpholinium bromide, an alkyl substituted pyrrolidinium chloride, an alkyl substituted pyrrolidinium bromide, or any combination thereof.

In some embodiments, the electrolyte comprises one or more additional components such as a glyme (e.g., monoglyme, diglyme, triglyme, tetraglyme, pentaglyme, hexaglyme, or any combination thereof), an ether (e.g., DME-PEG, dimethyl ether, or a combination thereof), an alcohol (e.g., methanol, ethanol, 1-propanol, isopropanol, 1-butanol, sec-butanol, iso-butanol, tert-butanol, or any combination thereof), a glycol (e.g., ethylene glycol, propylene glycol, 1,3-butylene glycol, 1,4-butylene glycol, neopentyl glycol, hexalene glycol, or any combination thereof), an additive (e.g., Sn, In, Ga, Al, Tl, Bi, Pb, Sb, Ag, Mn, Fe, or any combination thereof), an acid (e.g., acetic acid, nitric acid, citric acid, or any combination thereof), potassium dihydrogen citrate, a crown ether (e.g. 18-crown-6, 15-crown-5, or a combination thereof), citric acid monohydrate, or potassium dihydrogen citrate monohydrate.

In one embodiment, the electrolyte consists of zinc bromide, 27.42 wt %; water, 44.34 wt %; potassium bromide, 6.78 wt %; potassium chloride, 9.83%; 2,5,8,11,14-pentaoxapentadecane, 2.58 wt %; 4-ethyl-4-methylmorpholin-4-ium bromide, 1.03 wt %; tetraethylammonium bromide, 2.03 wt %; triethylmethylammonium chloride, 1.94 wt %; methoxypolyethylene glycol MW 2000, 1.29 wt %; methoxypolyethylene glycol MW 1000, 0.32 wt %; 2,2-dimethyl-1,3-propanediol, 1.29 wt %; 2-methylpropan-2-ol, 0.32 wt %; hexadecyltrimethylammonium bromide, 0.06 wt %; hydrobromic acid (to reach a pH of 3.6), 0.52 wt %; 1,1-dioctadecyl-4,4' bipyridinium dibromide, 0.25 wt %; tin chloride, 7 ppm; and indium chloride, 7 ppm.

In one embodiment, the electrolyte consists of zinc bromide, 35.41 wt %; water, 38.84 wt %; potassium bromide, 5.54 wt %; potassium chloride, 11.09 wt %; triethylmethylammonium chloride, 5.8 wt %; polyethyleneglycol dimethyl ether (MW 2000), 1.26 wt %; polyethyleneglycol dimethyl ether (MW 1000), 0.35 wt %; 2,2-dimethylpropane-1,3-diol, 1 wt %; polydimethylsiloxane trimethylsiloxy terminated (MW 1250), 0.2 wt %; indium chloride, 7 ppm; and tin chloride, 7 ppm.

B. Battery Stacks

Figure 18:
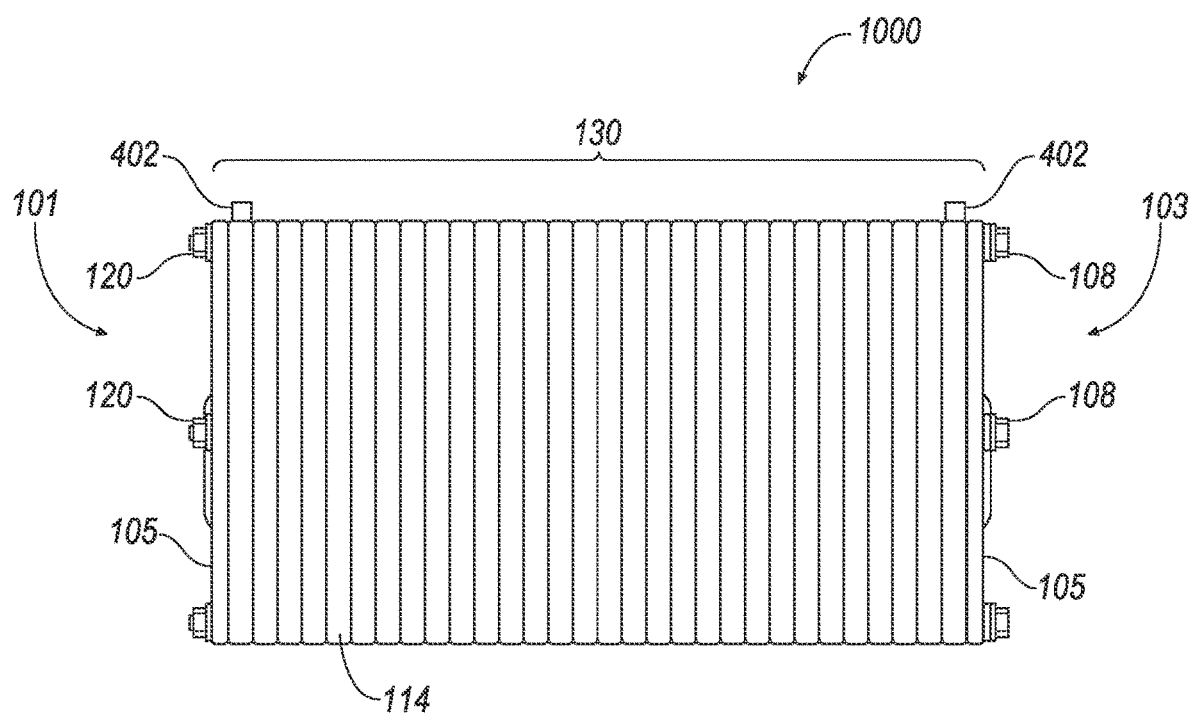
FIG. 18 is a side view of a battery stack comprising a cathode terminal and an anode terminal with bipolar electrodes and frame members between compression plates according to an embodiment of the present invention.
Figure 19:
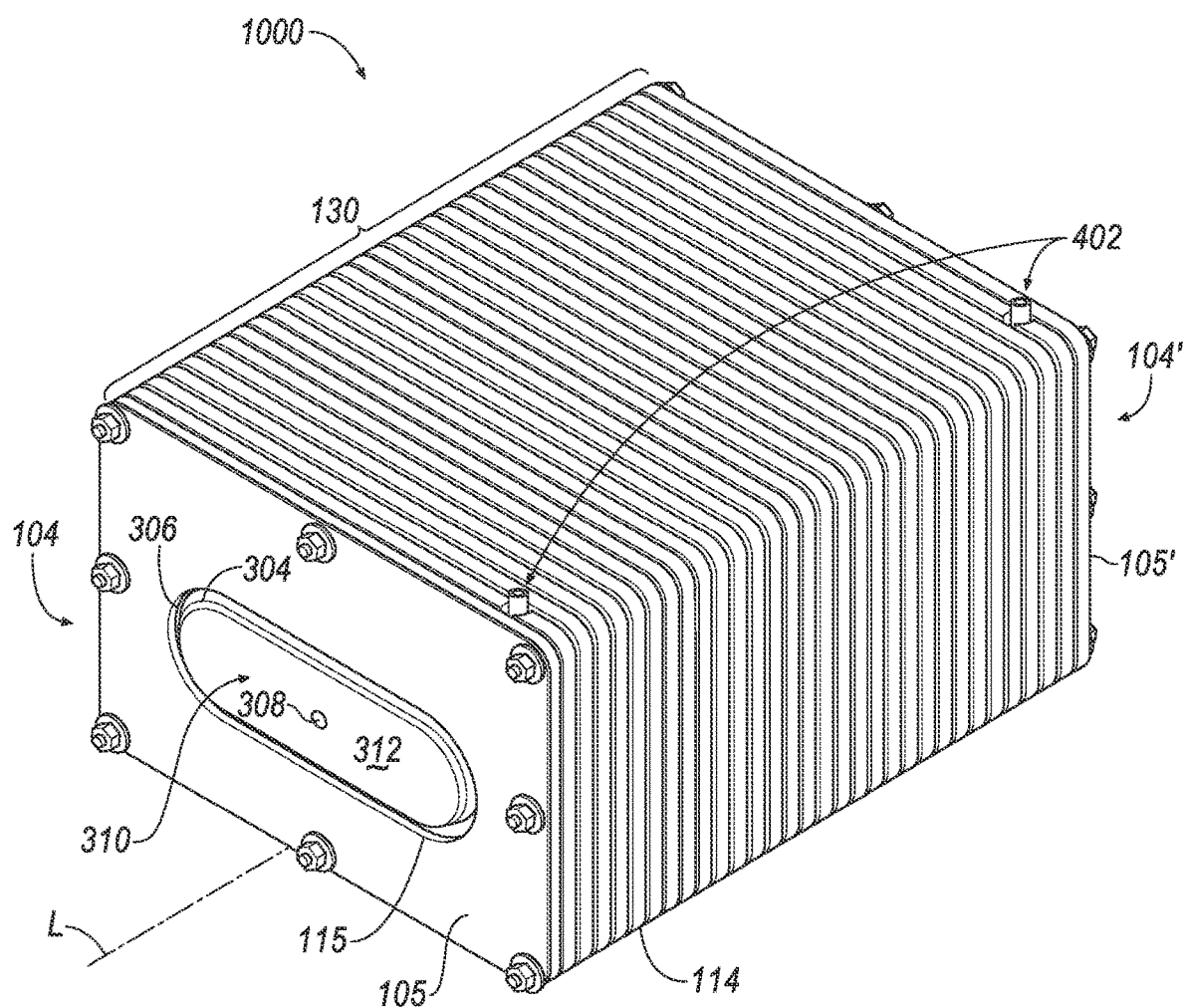
FIG. 19 is a top perspective view of a battery stack comprising a pair of terminal assemblies at corresponding proximal and distal ends of the battery module according to an embodiment of the present invention.
Figure 20:
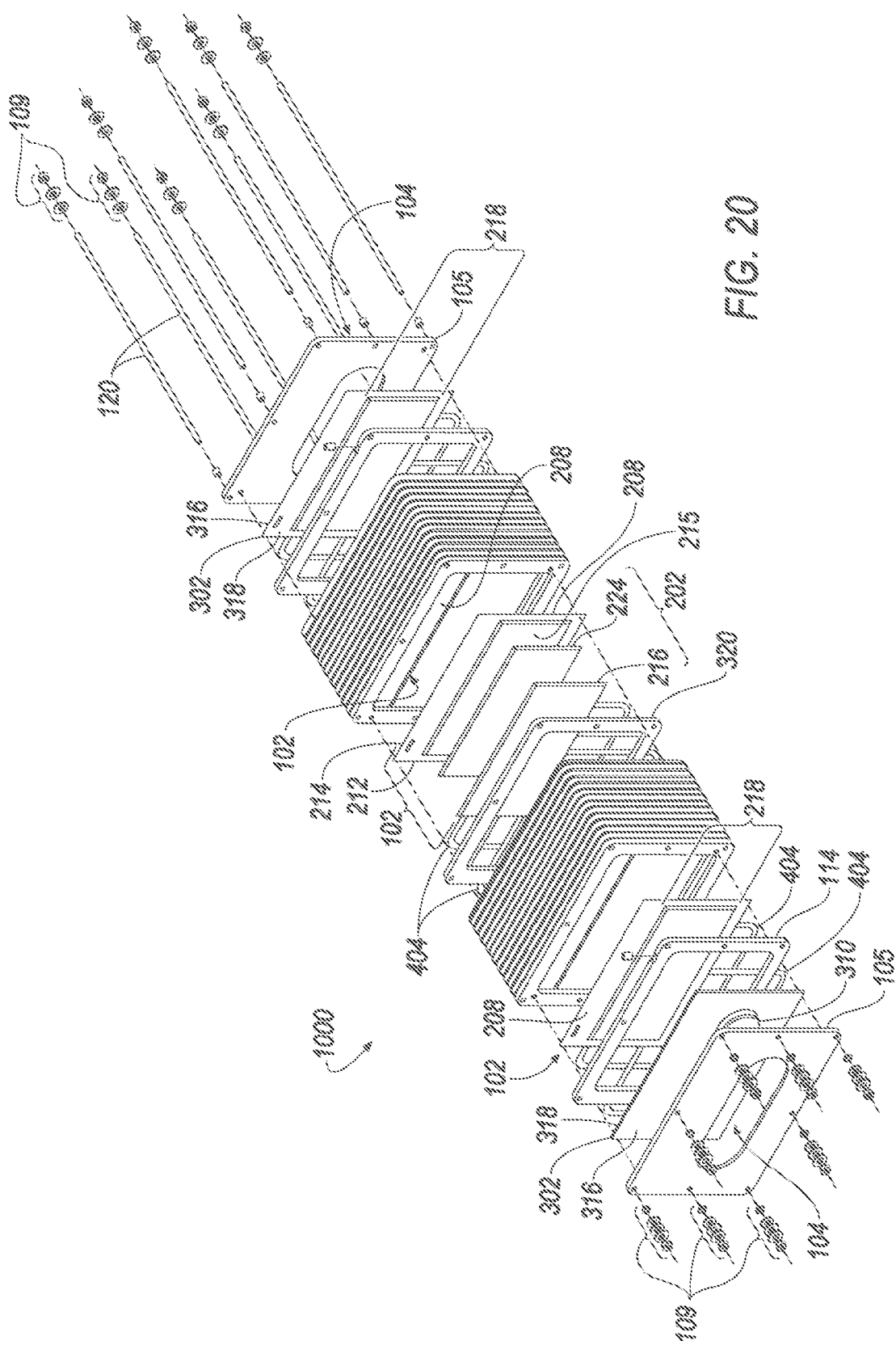
FIG. 20 is an exploded view of the battery stack of FIG. 18 according to an embodiment of the present invention.
Figure 21:
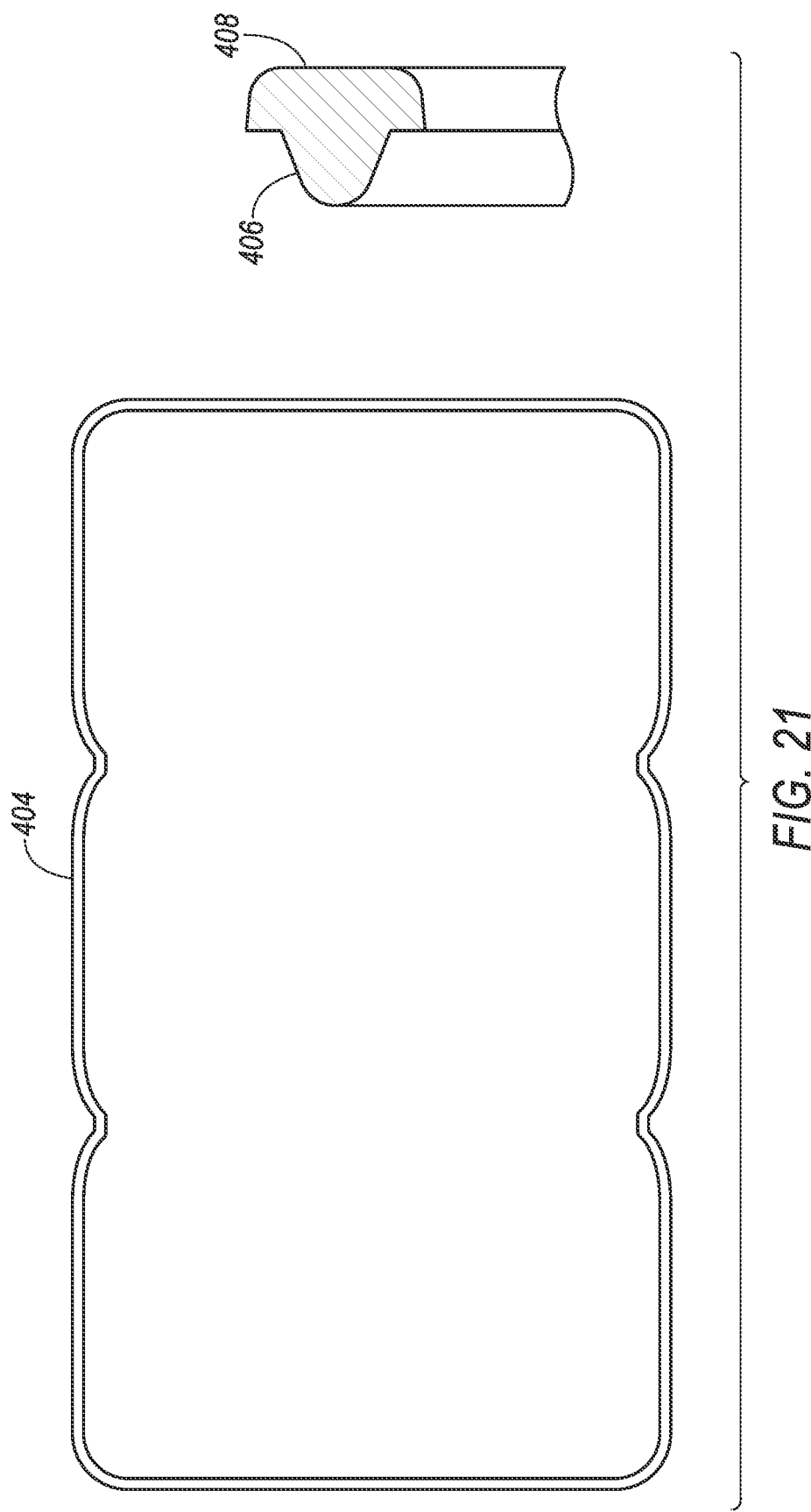
FIG. 21 shows a front view of a seal for use in the battery module of FIG. 20 and a cross sectional view of the seal.

Referring to FIGS. 18-20, another aspect of the present invention provides a battery stack comprising a plurality of bipolar electrodes at least partially disposed in zinc-halide electrolyte and interposed between a cathode terminal assembly and an anode terminal assembly. The cathode terminal assembly, the anode terminal assembly, the zinc-halide electrolyte, and the bipolar electrodes include any embodiments described herein.

1. Frame Members

In some embodiments, the battery stack or electrochemical cell of the present invention comprises a frame member 114 that is interposed between two adjacent bipolar electrodes or interposed between a bipolar electrode and a terminal assembly (e.g., a terminal anode assembly or a terminal cathode assembly).

In one embodiment, illustrated in FIG. 23, the frame member has an outer periphery edge 604, and an inner periphery edge 608 defining an open interior region 606. The inner periphery edge 608 defines the open interior region such that a cathode assembly of a bipolar electrode is immediately adjacent to an inner surface of a terminal endplate or a back surface of an adjacent bipolar electrode plate without interference or obstruction from the frame member. Thus, the open interior region is at least as large as the electrochemically active area of a terminal endplate and at least as large as a reduced surface of a pocket portion of a cathode cage of a cathode assembly. In some embodiments, the frame member is configured such that open interior region is approximately centered about the center of an electrochemically active region of a terminal endplate received by the frame member and/or the center of a cathode assembly disposed on a bipolar electrode plate of a bipolar electrode. In some embodiments, the outer periphery of the frame member defines the outer surface of a battery stack or electrochemical cell.

In some embodiments, the frame member includes a first side 614 that opposes and retains the first bipolar electrode plate or terminal endplate and a second side 616 disposed on an opposite side of the frame member than the first side that opposes and retains a second bipolar electrode plate. The first and second electrode plates and the terminal endplate(s) may be configured to have substantially the same size and shape.

In some embodiments, each side of the frame member includes a sealing groove 612 that extends around the inner periphery edge. In some examples, each sealing groove is sized and shaped to conform to the contour of the peripheral edge of the corresponding bipolar electrode plate or terminal endplate retained by the frame member. And, in some embodiments, each sealing groove is configured to receive a seal 116 (FIG. 21) (e.g., an o-ring or gasket) seated therein that forms a substantially leak-free seal when the seal is compressed between the corresponding electrode plate or endplate and the frame member when the electrochemical cell or battery stack is assembled to provide a sealing interface between the electrode plate or endplate and the frame member. The seals cooperate to retain the electrolyte between the opposing electrode plates and a frame member, or between an electrode plate, an endplate and a frame member.

In some embodiments, the frame member has one or more retaining fences 610 that protrude into the open interior region and restrain a compression plate 105 or electrode plate from movement when the battery is assembled. In other embodiments, one or more retaining fences may extend into the interior region from the inner periphery edge. In some examples, the retaining fences are operative to contact a substantially flat surface of the cathode cage (e.g., the pocket portion of the cathode cage) that protrudes away from the front surface of an electrode plate in a direction toward the frame member. The retaining fence may reduce or prevent the bending and deforming of the cathode cage from flat during charging of the battery module. The retaining fences may include openings or cut outs to reduce overall weight of the frame member.

Each frame member may be formed from flame retardant polypropylene fibers, polypropylene filled with glass fibers, flame retardant high density polyethylene (e.g., filled with glass fibers or unfilled), or polyvinyl chloride. Each frame member may receive two adjacent electrode plates or an electrode plate and a terminal endplate. And, one of the electrode plates may include a surface joined to a cathode assembly having a loaded carbon felt and a cathode cage enclosing the loaded carbon felt (or alternatively, a loaded carbon felt and a glue or adhesive with no cathode cage). Each frame may also house an aqueous electrolyte solution (e.g., zinc-halide electrolyte or zinc-bromide electrolyte). As illustrated in FIG. 19, a frame member disposed adjacent to a compression plate may optionally include one or more pressure release valves or rupture disks to release excess pressure from within the electrochemical cell or battery stack. In some embodiments, the pressure relief valve includes a molded carrier configured to extend through the frame and a pressure relief umbrella or rupture disks (e.g., rupture disks that rupture at about 300 psi or greater.

2. Compression Plates

Figure 22:
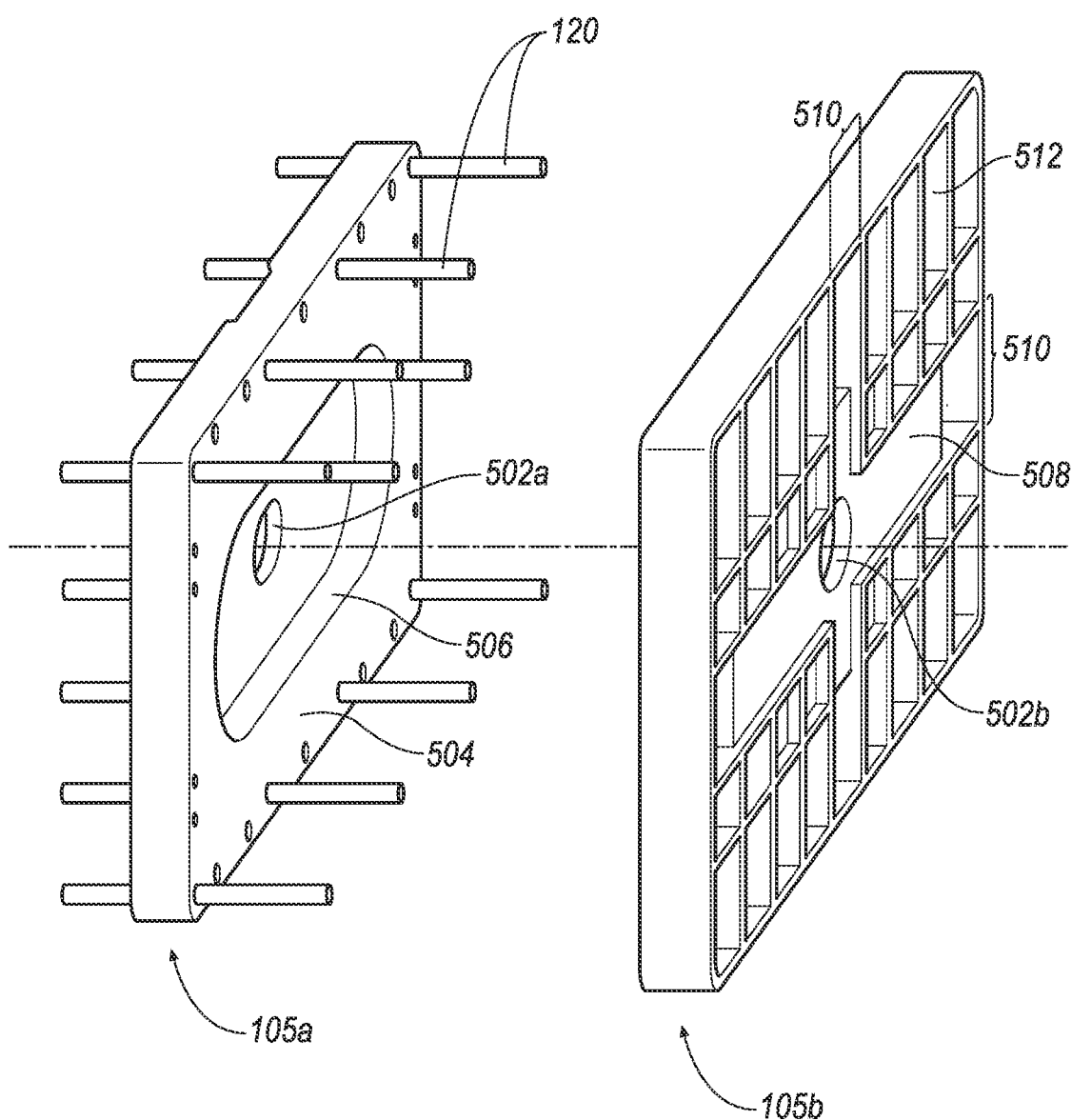
FIG. 22 shows a top perspective view of compression plates for the cathode terminal and anode terminal of the battery stack of FIG. 18 according to an embodiment of the present invention.

In some embodiments, the electrochemical cell or battery stack comprises a pair of compression plates 105, 105*a*, 105*b* located at the ends of the electrochemical cell or battery stack. In some embodiments, each compression plate includes an exterior surface 512 and an interior surface 504 disposed on an opposite side of the compression plate than the exterior surface and opposing an adjacent frame member. FIG. 22 shows the exterior surface of the compression plate associated with the positive (+) anode terminal of the electrochemical cell or battery stack and the interior surface of the compression plate associated with the negative (−) cathode of the electrochemical cell or battery stack. In some embodiments, the compression plates are formed from 6061-T6 aluminum and may be manufactured by stamping. In other embodiments, the compression plates are formed of stainless steel and may be manufactured by machining. And, in some embodiments, the compression plates are formed of milled steel.

In some embodiments, a terminal hole 502*a*, 502*b* extends through each compression plate to expose a corresponding terminal for electrical connection with a connection/power cable. In some embodiments, the compression plates have thru holes formed through the compression plates that are operative to receive one or more frame bolts or tie rods 120. For example, a first row of four (4) thru holes may be spaced apart (e.g., evenly spaced apart) along the top edge of each compression plate and a second row of four (4) thru holes may be spaced apart (e.g., evenly spaced apart) along the bottom edge of each compression plate.

The outer surface of each compression plate may include cut-outs 508 to reduce weight of the compression plates and to define reinforcement members that reduce stress concentration when the compression plate contacts adjacent terminal frame members. Moreover, the cut-outs may dissipate heat that the electrochemical cell or battery stack generates. The exterior surface and the cut-outs may define one or more channels 510 operative to receive and route the connection/power cables that electrically connect with the exposed terminals and/or a wiring harness for the assembled battery module. And, in some embodiments, each interior surface of the compression plate has one or more cut-outs.

In some embodiments, the interior surface of each compression plate may include a substantially flat surface operative to engage an outer surface of an adjacent frame member. In some embodiments, the interior surface of each compression plate also defines a recessed area having a size and shape configured to receive at least a portion of a conductive cup-shaped member joined to and protruding from the terminal endplate associated with the corresponding adjacent compression plate. In some embodiments, an aperture may extend through the interior and exterior surfaces of the compression plate endplate in place of the recessed area to expose at least a portion of a conductive-cup shaped member and terminal.

In some embodiments of electrochemical cells or battery stacks of the present invention, each frame member and each pair of compression plates have corresponding thru holes that are configured to receive bolts or tie rods therethrough and operate to compress these components using fasteners (e.g., nuts 108 and/or washers 106, 110) to assemble a substantially sealed electrochemical cell or battery stack.

In some embodiments, each frame member, each compression plate, each terminal endplate, and each bipolar electrode plate has one or more corresponding thru holes that operate to align the components such that the terminal, the conductive cup-shaped member, the cathode assembly, and the electrochemically active region share the same approximate center when dowels 112 are placed therethrough.

In some embodiments, the battery stack comprises a first bipolar electrode, a second bipolar electrode, and a frame member 114, wherein the frame member is interposed between the first bipolar electrode, the frame member has a first side and a second side, the first bipolar electrode has a first electrode plate, and the second bipolar electrode has a second bipolar plate; and wherein the first side of the frame member is configured to receive at least a portion of a front side of the first electrode plate, and the second side of the frame member is configured to receive at least a portion of a back side of the second electrode plate.

Referring to FIGS. 19 and 20, another aspect of the present invention provides a bipolar battery stack defining a longitudinal axis L, the bipolar battery 1000 comprising a pair of terminal assemblies 104 at corresponding proximal and distal ends of the battery, each terminal assembly comprising a conductive cup-shaped member 310 comprising a terminal wall 312, a sidewall 304, and a rim 306 separated from the terminal wall by the sidewall; and a terminal endplate 302 having outer and inner surfaces 316, 318 coplanar with the terminal wall and joining to the corresponding rim at the outward surface, the joining enabling bi-directional uniform current flow through the cup-shaped member between a corresponding terminal 308 and the endplate when the corresponding terminal wall is in electrical contact with the corresponding terminal. In some embodiments, the terminal assembly corresponds to the terminal assembly 104 described above with reference to FIGS. 12-17. In some embodiments, the battery stack 1000 further comprises at least one pair of intermediate bipolar electrodes 102, 102' arranged in a parallel orientation between the pair of terminal assemblies. In these embodiments, the intermediate cells comprise bipolar electrodes for distributing current between the terminal assemblies. Each intermediate cell comprises a frame member 114 that houses components of the cell.

FIG. 20 provides an exploded view of the battery stack of FIG. 19. In some embodiments, each battery stack or electrochemical cell further comprises corresponding compression plates 105a, 105b opposed to and releasably fastened in contact with the outer surfaces of the endplates 302, each compression plate comprising an aperture 502a, 502b configured to receive the corresponding terminal 308. In some of these embodiments, at least a portion of the terminal wall of the conductive cup-shaped member is exposed through the aperture of the compression plate. In other embodiments, the terminal wall and at least a portion of the sidewall is exposed through the aperture of the compression plates. FIG. 7 illustrates the compression plates having their corresponding apertures formed therethrough. In other embodiments, a recessed area may be disposed at the inward surface of each compression plate that is configured to receive the corresponding cup-shaped member. In these embodiments, a terminal hole may be formed through the recessed area of each compression plate to expose the terminal. In some embodiments, outward/exterior surfaces of the compression plates include cut-outs to reduce the overall weight of the compression plates and to help dissipate heat generated by the battery.

In some embodiments, the compression plates include openings operative to receive tie rods and/or bolts secured by fasteners to compress the two compression plates and intervening frame members together along longitudinal axis L (FIG. 19) when the battery stack is assembled.

In some embodiments, an electrochemically active region of each corresponding terminal endplate comprises a first surface area enclosed by the corresponding rim and a remaining second surface area outside an outer periphery of the corresponding rim, the first and second surface areas being substantially equal.

In some embodiments, each terminal wall projects away from the outward surface of the corresponding endplate.

In some embodiments, one of the terminal walls projects away from the outward surface of the corresponding endplate in a proximal direction along the longitudinal axis and the other terminal wall projects away from the outward surface of the corresponding endplate in an opposite distal direction along the longitudinal axis.

In some embodiments, the terminal walls of the conductive cup-shaped members are exposed at corresponding ones of the proximal and distal ends of the electrochemical cell assembly.

In some embodiments, one of the terminal assemblies in the battery stack or electrochemical cells further comprises a cathode assembly 202 disposed on an inner surface of the corresponding endplate on a side opposite the corresponding conductive cup-shaped member, the cathode assembly interposed between the inner surface of the endplate and a back surface of an adjacent bipolar electrode plate.

In some embodiments, each rim is centered within the electrochemically active region of the corresponding endplate.

In some embodiments, each rim of the conductive cup-shaped members is joined to the outward surface of the corresponding endplate by a weld or an adhesive. In some instances, the adhesive is electrically conductive.

In some embodiments, at least one of the conductive cup-shaped members comprises a copper/titanium clad.

In some embodiments, interior surfaces of at least one of the conductive cup-shaped members comprises copper. In other embodiments, exterior surfaces of at least one of the conductive cup-shaped members comprises titanium.

In some embodiments, each corresponding terminal contacts a central location of the corresponding terminal wall.

In some embodiments, the rim comprises a flange extending radially outward from the sidewall.

IV. EXAMPLES

Example 1: Preparation of Loaded Carbon Felt

A mixture of 35 g poly(diallyldimethylammonium chloride) (low molecular weight), 35 g nano27 graphite (Asbury Carbons; Asbury, N.J.), 4000 g of isopropanol, and 3500 g of water was prepared. (The water was pre-mixed in the commercially available polymer solution). The weight percentages of the solution were accordingly 0.46 wt % poly (diallyldimethylammonium chloride), 0.46 wt % nano27 graphite, 52.8 wt % ethanol, and 46.2 wt % water. The mixture was thoroughly mixed and sonicated. Three equivalent pieces of 6.4 mm thick, dry PAN-fiber-based carbon felt—which was pre-modified by carbonizing, activating and graphitizing processes—were dipped in the mixture and submerged for about 15 seconds. The pieces were removed and the excess mixture was drained. Each piece, Test Samples 1, 2 and 3 were placed on a drying rack and dried in a fume hood for 24 hours. The felts were weighed to measure the uptake of polymer and nanocarbon materials. The uptake of the polymer and nanocarbon materials (i.e., poly(diallyldimethylammonium chloride) and nano27 graphite) was 0.1 g per gram of the carbon felt.

A control sample, Control Sample 1, was a fourth equivalent piece of 6.4 mm thick dry carbon felt that had undergone pre-modification by carbonizing, activating and graphitizing processes—but which did not undergo the loading processing.

Example 2: Preparation of Bipolar Electrodes

Bipolar electrodes were prepared using the loaded carbon felts of Example 1. The carbon felts, Test Samples 1, 2 and 3, and Control Sample 1 were each attached to titanium plates to form bipolar electrodes. The electrode plate and terminal plate were formed of titanium metal that was coated with TiC (commercially available from Titanium Metals Corporation, Exton, Pa.) and formed into plates having 45° chamfered corners (length ~13.5 cm, width ~8.375 cm, thickness ~0.005 cm). To attach the carbon felts, 5 mL of glue was applied to the cathode surface of the titanium plates and the loaded carbon felt was placed on top of the glue and 5 psi of pressure was applied to the top of the loaded carbon felt. The glue was then dried for 1 hour. The glue was 61.11 wt % acetone, 14.44 wt % Kynar 2750, 7.78 wt % Elvacite 4111, and 16.67 wt % Timrex KS6 graphite.

Example 3: Preparation of Test Cells

The bipolar electrodes of Example 2 were incorporated into test cells. On an outer facing surface of each of the bipolar electrode plates (of Example 2), a conductive cup-shaped member was laser welded such that the center of the cup-shaped member was approximately aligned or centered with the center of the reduced surface of the cathode cage. Thus, this component served as a terminal cathode assembly and bipolar electrode for the test cell. A terminal anode assembly was likewise formed of a terminal endplate having dimensions substantially the same as those of the bipolar electrode plate with an elliptical cup-shaped member that was laser welded to the outer surface of the terminal anode endplates such that the center of the cup-shaped member was approximately collinear with the center of the cup-shaped member of the terminal cathode assembly. Conductive cup-shaped members were formed from stamped titanium carbide material. The test cells were finally assembled with the interposition of a single high density polyethylene frame member having a sealing ring seated therein between the terminal anode assembly and the terminal cathode assembly and compressing the components between two opposing steel compression plates.

Dry test cells were constructed and filled to approximately 90% capacity (i.e., about 10% head space) with a zinc halide electrolyte. The zinc halide electrolyte was made according to the following recipe: zinc bromide, 35.41 wt %; water, 38.84 wt %; potassium bromide, 5.54 wt %; potassium chloride, 11.09 wt %; triethylmethylammonium chloride, 5.8 wt %; polyethyleneglycol dimethyl ether (MW 2000), 1.26 wt %; polyethyleneglycol dimethyl ether (MW 1000), 0.35 wt %; 2,2-dimethylpropane-1,3-diol, 1 wt %; polydimethylsiloxane trimethylsiloxy terminated (MW 1250), 0.2 wt %; indium chloride, 7 ppm; and tin chloride, 7 ppm.

The corresponding Tests Cells were labeled Test Cell 1 (incorporating the loaded carbon felt of Test Sample 1), Test Cell 2 (incorporating the loaded carbon felt of Test Sample 2), Test Cell 3 (incorporating the loaded carbon felt of Test Sample 3), and Control Cell 1 (incorporating the carbon felt of Control Sample 1).

Example 4: Voltage Profiles of Test Cells

The test cells and control cell of Example 3 were cycled using an Arbin Instruments battery cycler. The cells were charged at a constant power of 2.6 W to a capacity of 15.7 Wh. The charge voltage limit was 1.95 V. The cells were discharged at a constant power of 2.6 W until the voltage reached 1.1 V.

Figure 24:
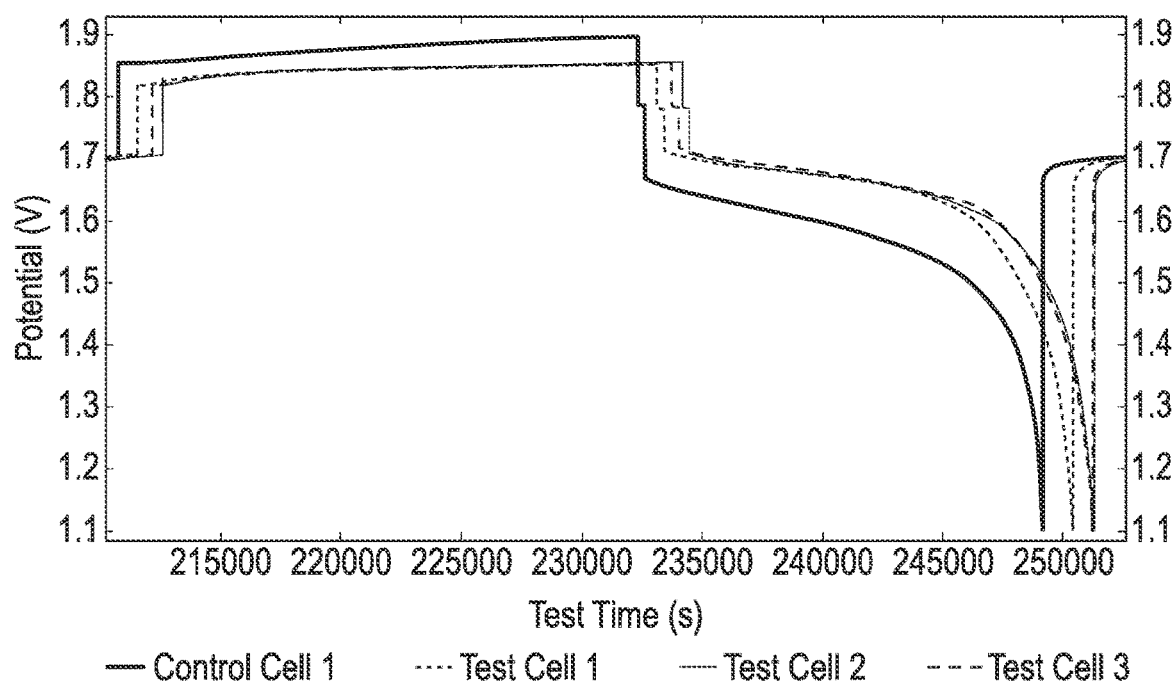
FIG. 24 is a voltage profile of the test cells of Examples 1-4.

FIG. 24 shows the voltage profiles for cycle 5 of the test cells and control cell. As shown in FIG. 24, the control cell has a higher charge voltage and lower discharge voltage than the test cells. The test cells have lower charge voltage and higher discharge voltage, yielding higher overall round trip energy efficiency compared to the control cell.

Figure 25:
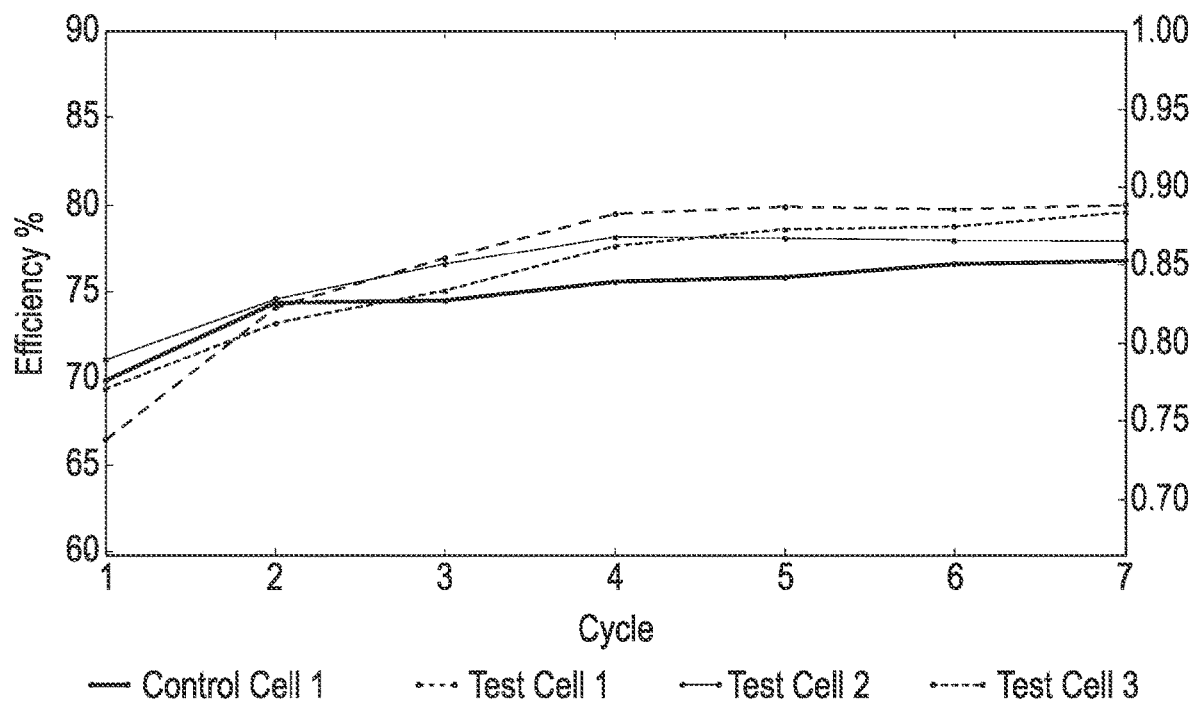
FIG. 25 is a plot of efficiency over seven cycles for the test cells of Examples 1-4.

FIG. 25 shows the energy efficiency for cycles 1-7 of the test cells and control cell. At cycle 5, the energy efficiency of the control cell is 75.8%, and the average energy efficiency of the test cells is 78.7%. The higher energy efficiency of the test cells is a substantial and unexpected improvement over the control cell.

OTHER EMBODIMENTS

It should be apparent that the foregoing relates only to the preferred embodiments of the present invention and that numerous changes and modifications may be made herein without departing from the spirit and scope of the invention as defined by the following claims and equivalents thereof.

What is claimed is:

1. A bipolar electrode comprising:
a plate of titanium having a cathode surface and an anode surface; and
a carbon felt loaded with a polymer material and a nanocarbon material, wherein the cathode surface opposes the anode surface, and the cathode surface at least partially contacts the carbon felt.

2. The bipolar electrode of claim 1, wherein the polymer material is selected from poly(diallyldimethylammonium chloride), polyvinylidene fluoride, nafion, polytetrafluoroethylene, poly(acrylic acid), polypyrrole, polyacrylamide, poly(N,N-dimethyl)-3,4-pyrrolidinium bromide, or any combination thereof.

3. The bipolar electrode of claim 1, wherein the polymer material is poly(diallyldimethylammonium chloride).

4. The bipolar electrode of claim 1, wherein the nanocarbon material comprises a powder, wherein the powder comprises graphite, carbon, or any combination thereof; and the powder has a mean particle diameter of less than about 100 microns.

5. The bipolar electrode of claim 1, wherein the nanocarbon material comprises titanium carbide powder, graphene powder, carbon nanotubes, nanographite powder, or any combination thereof.

6. The bipolar electrode of claim 1, wherein the nanocarbon material has a mean surface area of from about 50 to about 1000 $m^2$/gram of nanocarbon material.

7. The bipolar electrode of claim 6, wherein the nanocarbon material has a mean surface area of from about 200 to about 300 $m^2$/gram of nanocarbon material.

8. The bipolar electrode of claim 1, wherein the carbon felt is carbonized, graphitized, activated, or any combination thereof.

9. The bipolar electrode of claim 1, wherein the carbon felt has a thickness of from about 2 mm to about 10 mm.

10. The bipolar electrode of claim 1, wherein the carbon felt is loaded with a total concentration of the polymer material and the nanocarbon material of from about 0.001 to about 0.5 grams per gram of the carbon felt.

11. The bipolar electrode of claim 10, wherein the carbon felt is loaded with a total concentration of the polymer material and the nanocarbon material of from about 0.01 to about 0.3 grams per gram of the carbon felt.

12. The bipolar electrode of claim 1, wherein the polymer material is poly(diallyldimethylammonium chloride) and the nanocarbon material comprises graphite powder having a mean surface area of from about 50 to about 1000 m$^2$/gram of nanocarbon material.

13. A process for manufacturing a bipolar electrode, the process comprising:
   mixing a polymer material, a nanocarbon material, and a solvent to form a mixture;
   contacting a carbon felt with the mixture, wherein the carbon felt is loaded with the mixture to create a loaded carbon felt; and
   contacting at least a portion of the loaded carbon felt with a cathodic side of a titanium plate to form the bipolar electrode.

14. The process of claim 13, further comprising drying the loaded carbon felt.

15. The process of claim 13, further comprising sonicating the mixture before and/or during contacting the carbon felt with the mixture.

16. The process of claim 13, wherein a concentration of the polymer material in the mixture is from about 0.01 wt % to about 10 wt %, a concentration of the nanocarbon material in the mixture is from about 0.01 wt % to about 25 wt %, and a concentration of solvent in the mixture is from about 65 wt % to about 99.98 wt %.

17. The process of claim 13, wherein the carbon felt is dipped in the mixture.

18. The process of claim 13, further comprising treating the carbon felt, wherein the treating is selected from carbonizing, activating, graphitizing, or any combination thereof.

19. The process of claim 18, wherein the carbonizing, activating, graphitizing, or any combination thereof occurs prior to contacting the carbon felt with the mixture.

20. An electrochemical cell comprising:
   a bipolar electrode comprising a plate of titanium having a cathode surface and an anode surface and a carbon felt loaded with a polymer material and a nanocarbon material, wherein the cathode surface opposes the anode surface, and the cathode surface at least partially contacts the carbon felt; and
   an aqueous zinc-halide electrolyte.

21. The electrochemical cell of claim 20, wherein the polymer material is selected from poly(diallyldimethylammonium chloride), polyvinylidene fluoride, nafion, polytetrafluoroethylene, poly(acrylic acid), polypyrrole, polyacrylamide, poly(N,N-dimethyl)-3,4-pyrrolidinium bromide, or any combination thereof.

22. The electrochemical cell of claim 20, wherein the polymer material is poly(diallyldimethylammonium chloride).

23. The electrochemical cell of claim 20, wherein the nanocarbon material comprises a powder, wherein the powder comprises graphite, carbon, or any combination thereof; and the powder has a mean particle diameter of less than about 100 microns.

24. The electrochemical cell of claim 20, wherein the nanocarbon material comprises titanium carbide powder, graphene powder, carbon nanotubes, nanographite powder, or any combination thereof.

25. The electrochemical cell of claim 20, wherein the nanocarbon material has a mean surface area of from about 50 to about 1000 m$^2$/gram of nanocarbon material.

26. The electrochemical cell of claim 25, wherein the nanocarbon material has a mean surface area of from about 200 to about 300 m$^2$/gram of nanocarbon material.

27. The electrochemical cell of claim 20, wherein the carbon felt is carbonized, graphitized, activated, or any combination thereof.

28. The electrochemical cell of claim 20, wherein the carbon felt has a thickness of from about 2 mm to about 10 mm.

29. The electrochemical cell of claim 20, wherein the carbon felt is loaded with a total concentration of the polymer material and the nanocarbon material of from about 0.001 to about 0.5 grams per gram of the carbon felt.

30. The electrochemical cell of claim 29, wherein the carbon felt is loaded with a total concentration of the polymer material and the nanocarbon material of from about 0.01 to about 0.3 grams per gram of the carbon felt.

31. The electrochemical cell of claim 20, wherein the polymer material is poly(diallyldimethylammonium chloride) and the nanocarbon material comprises graphite powder having a mean surface area of from about 50 to about 1000 m$^2$/gram of nanocarbon material.

32. The electrochemical cell of claim 20, wherein the aqueous zinc-halide electrolyte comprises from about 25 wt % to about 70 wt % of $ZnBr_2$; from about 5 wt % to about 50 wt % of water; and from about 0.05 wt % to about 10 wt % of one or more quaternary ammonium agents.

33. The electrochemical cell of claim 32, wherein the aqueous zinc-halide electrolyte comprises from about 25 wt % to about 40 wt % of $ZnBr_2$; from about 25 wt % to about 50 wt % water; from about 5 wt % to about 15 wt % of KBr; from about 5 wt % to about 15 wt % of KCl; and from about 0.5 wt % to about 10 wt % of the one or more quaternary ammonium agents.

34. The electrochemical cell of claim 32, wherein the one or more quaternary ammonium agents comprises a quaternary agent selected from the group consisting of ammonium chloride, tetraethylammonium bromide, tetraethyl ammonium chloride, trimethylpropylammonium bromide, triethylmethylammonium chloride, trimethylpropylammonium chloride, butyltrimethylammonium chloride, trimethylethyl ammonium chloride, N-methyl-N-ethylmorpholinium bromide, N-methyl-N-ethylmorpholinium bromide (MEMBr), 1-ethyl-1-methylmorpholinium bromide, N-methyl-N-butylmorpholinium bromide, N-methyl-N-ethylpyrrolidinium bromide, N,N,N-triethyl-N-propylammonium bromide, N-ethyl-N-propylpyrrolidinium bromide, N-propyl-N-butylpyrrolidinium bromide, N-methyl-N-butylpyrrolidinium bromide, 1-methyl-1-butyl pyrrolidinium bromide, N-ethyl-N-(2-chloroethyl)pyrrolidinium bromide, N-methyl-N-hexylpyrrolidinium bromide, N-methyl-N-pentylpyrrolidinium bromide, N-ethyl-N-pentyl pyrrolidinium bromide, N-ethyl-N-butyl pyrrolidinium bromide, trimethylene-bis(N-methyl pyrrolidinium) dibromide, N-butyl-N-pentyl pyrrolidinium bromide, N-methyl-N-propylpyrrolidinium bromide, N-propyl-N-pentylpyrrolidinium bromide, 1-ethyl-4-methyl pyridinium bromide, 1-ethyl-2-methyl pyridinium bromide, 1-butyl-3-methylpyridinium bromide, cetyltrimethylammonium bromide, cetyltrimethylammonium chloride, cetyltriethylammonium bromide, and any combination thereof.

35. The electrochemical cell of claim 32, wherein the one or more quaternary ammonium agents comprises an alkyl substituted pyridinium chloride, an alkyl substituted pyridinium bromide, an alkyl substituted morpholinium chloride, an alkyl substituted morpholinium bromide, an alkyl substituted pyrrolidinium chloride, an alkyl substituted pyrrolidinium bromide, or any combination thereof.

36. A battery stack comprising:
a pair of terminal assemblies;
at least one bipolar electrode interposed between the pair of terminal assemblies wherein the bipolar electrode comprises:
a bipolar electrode plate comprising titanium;
a carbon felt, wherein the carbon felt is loaded with a polymer material and a nanocarbon material; and
an aqueous zinc-halide electrolyte in contact with the bipolar electrode plate and the carbon felt.

37. The battery stack of claim 36, wherein the polymer material is selected from poly(diallyldimethylammonium chloride), polyvinylidene fluoride, nafion, polytetrafluoroethylene, poly(acrylic acid), polypyrrole, polyacrylamide, poly(N,N-dimethyl)-3,4-pyrrolidinium bromide, or any combination thereof.

38. The battery stack of claim 36, wherein the polymer material is poly(diallyldimethylammonium chloride).

39. The battery stack of claim 36, wherein the nanocarbon material comprises a powder, wherein the powder comprises graphite, carbon, or any combination thereof; and the powder has a mean particle diameter of less than about 100 microns.

40. The battery stack of claim 36, wherein the nanocarbon material comprises titanium carbide powder, graphene powder, carbon nanotubes, nanographite powder, or any combination thereof.

41. The battery stack of claim 36, wherein the nanocarbon material has a mean surface area of from about 50 to about 1000 $m^2$/gram of nanocarbon material.

42. The battery stack of claim 41, wherein the nanocarbon material has a mean surface area of from about 200 to about 300 $m^2$/gram of nanocarbon material.

43. The battery stack of claim 36, wherein the carbon felt is carbonized, graphitized, activated, or any combination thereof.

44. The battery stack of claim 36, wherein the carbon felt has a thickness of from about 2 mm to about 10 mm.

45. The battery stack of claim 36, wherein the carbon felt is loaded with a total concentration of the polymer material and the nanocarbon material of from about 0.001 to about 0.5 grams per gram of the carbon felt.

46. The battery stack of claim 45, wherein the carbon felt is loaded with a total concentration of the polymer material and the nanocarbon material of from about 0.01 to about 0.3 grams per gram of the carbon felt.

47. The battery stack of claim 36, wherein the polymer material is poly(diallyldimethylammonium chloride) and the nanocarbon material comprises graphite powder having a mean surface area of from about 50 to about 1000 $m^2$/gram of nanocarbon material.

48. The battery stack of claim 36, wherein the aqueous zinc-halide electrolyte comprises from about 25 wt % to about 70 wt % of $ZnBr_2$; from about 5 wt % to about 50 wt % of water; and from about 0.05 wt % to about 10 wt % of one or more quaternary ammonium agents.

49. The battery stack of claim 48, wherein the aqueous zinc-halide electrolyte comprises from about 25 wt % to about 40 wt % of $ZnBr_2$; from about 25 wt % to about 50 wt % water; from about 5 wt % to about 15 wt % of KBr; from about 5 wt % to about 15 wt % of KCl; and from about 0.5 wt % to about 10 wt % of the one or more quaternary ammonium agents.

50. The battery stack of claim 48, wherein the one or more quaternary ammonium agents comprises a quaternary agent selected from the group consisting of ammonium chloride, tetraethylammonium bromide, tetraethylammonium chloride, trimethylpropylammonium bromide, triethylmethylammonium chloride, trimethylpropylammonium chloride, butyltrimethylammonium chloride, trimethylethyl ammonium chloride, N-methyl-N-ethylmorpholinium bromide, N-methyl-N-ethylmorpholinium bromide (MEMBr), 1-ethyl-1-methylmorpholinium bromide, N-methyl-N-butylmorpholinium bromide, N-methyl-N-ethylpyrrolidinium bromide, N,N,N-triethyl-N-propylammonium bromide, N-ethyl-N-propylpyrrolidinium bromide, N-propyl-N-butylpyrrolidinium bromide, N-methyl-N-butylpyrrolidinium bromide, 1-methyl-1-butyl pyrrolidinium bromide, N-ethyl-N-(2-chloroethyl)pyrrolidinium bromide, N-methyl-N-hexylpyrrolidinium bromide, N-methyl-N-pentylpyrrolidinium bromide, N-ethyl-N-pentyl pyrrolidinium bromide, N-ethyl-N-butyl pyrrolidinium bromide, trimethylene-bis(N-methyl pyrrolidinium) dibromide, N-butyl-N-pentyl pyrrolidinium bromide, N-methyl-N-propylpyrrolidinium bromide, N-propyl-N-pentylpyrrolidinium bromide, 1-ethyl-4-methyl pyridinium bromide, 1-ethyl-2-methyl pyridinium bromide, 1-butyl-3-methylpyridinium bromide, cetyltrimethylammonium bromide, cetyltrimethylammonium chloride, cetyltriethylammonium bromide, and any combination thereof.

51. The battery stack of claim 48, wherein the one or more quaternary ammonium agents comprises an alkyl substituted pyridinium chloride, an alkyl substituted pyridinium bromide, an alkyl substituted morpholinium chloride, an alkyl substituted morpholinium bromide, an alkyl substituted pyrrolidinium chloride, an alkyl substituted pyrrolidinium bromide, or any combination thereof.

* * * * *